United States Patent
Ford

(10) Patent No.: US 11,134,087 B2
(45) Date of Patent: Sep. 28, 2021

(54) SYSTEM IDENTIFYING INGRESS OF PROTECTED DATA TO MITIGATE SECURITY BREACHES

(71) Applicant: Forcepoint, LLC, Austin, TX (US)

(72) Inventor: Richard A. Ford, Austin, TX (US)

(73) Assignee: Forcepoint, LLC, Austin, TX (US)

( * ) Notice: Subject to any disclaimer, the term of this patent is extended or adjusted under 35 U.S.C. 154(b) by 321 days.

(21) Appl. No.: 16/119,353

(22) Filed: Aug. 31, 2018

(65) Prior Publication Data

US 2020/0076826 A1 Mar. 5, 2020

(51) Int. Cl.
*H04L 29/06* (2006.01)
*G06F 21/62* (2013.01)
*G06F 21/55* (2013.01)

(52) U.S. Cl.
CPC ........... *H04L 63/12* (2013.01); *G06F 21/552* (2013.01); *G06F 21/6218* (2013.01); *H04L 63/1425* (2013.01); *H04L 63/20* (2013.01)

(58) Field of Classification Search
CPC .... G06F 21/552; G06F 21/604; G06F 21/606; G06F 21/6218; H04L 63/12; H04L 63/1425; H04L 63/20; H04L 63/126
See application file for complete search history.

(56) References Cited

U.S. PATENT DOCUMENTS

| | | | |
|---|---|---|---|
| 7,249,369 B2 | 7/2007 | Knouse et al. | |
| 7,558,775 B1 | 7/2009 | Panigrahy et al. | |
| 7,574,740 B1 | 8/2009 | Kennis | |
| 7,882,538 B1 | 2/2011 | Palmer | |
| 7,916,702 B2 | 3/2011 | Hirano et al. | |
| 7,941,484 B2 | 5/2011 | Chandler et al. | |
| 7,965,830 B2 | 6/2011 | Fleck et al. | |
| 8,060,904 B1 | 11/2011 | Evans et al. | |
| 8,230,505 B1 | 7/2012 | Ahrens et al. | |
| 8,341,734 B1 * | 12/2012 | Hernacki | G06F 16/24 726/21 |
| 8,347,392 B2 | 1/2013 | Chess et al. | |
| 8,432,914 B2 | 4/2013 | Zinjuwadia et al. | |
| 8,463,612 B1 | 6/2013 | Neath et al. | |
| 8,856,869 B1 | 10/2014 | Brinskelle | |

(Continued)

OTHER PUBLICATIONS

Thomas R. Hurd et al., A framework for analyzing contagion in assortative banking networks, PLoS One 12(2): e0170579, 2017.

(Continued)

*Primary Examiner* — Baotran N To
(74) *Attorney, Agent, or Firm* — Terrile, Cannatti & Chambers; Stephen A. Terrile

(57) ABSTRACT

A method, system and computer-usable medium for mitigating security breaches associated with dissemination of protected data. In certain embodiments, the method includes receiving information communicated to a secured network from a source external to the secured network and determining whether the received information includes protected data. If the received information includes protected data, a determination is made as to whether the receipt of the protected data is anomalous. If the receipt of the protected data is anomalous, one or more sources of egress of the protected data from the secured network are identified. By identifying the sources of egress, actions may be taken to prevent future egress of the protected data.

20 Claims, 10 Drawing Sheets

(56) References Cited

U.S. PATENT DOCUMENTS

| | | | |
|---|---|---|---|
| 9,146,953 B1* | 9/2015 | Hernacki | G06F 21/556 |
| 9,183,258 B1 | 11/2015 | Taylor et al. | |
| 9,197,601 B2 | 11/2015 | Pasdar | |
| 9,208,316 B1 | 12/2015 | Hill et al. | |
| 9,208,450 B1* | 12/2015 | Nanda | G06F 40/10 |
| 9,363,164 B2 | 6/2016 | Lemieux | |
| 9,367,872 B1 | 6/2016 | Visbal et al. | |
| 9,374,228 B2 | 6/2016 | Pendarakis et al. | |
| 9,380,523 B1 | 6/2016 | Mijar et al. | |
| 9,419,855 B2 | 8/2016 | Ganichev et al. | |
| 9,465,668 B1 | 10/2016 | Roskind et al. | |
| 9,491,183 B1 | 11/2016 | Dippenaar | |
| 9,525,838 B2 | 12/2016 | Thiyagarajan | |
| 9,826,023 B2 | 11/2017 | Yu | |
| 9,847,910 B2 | 12/2017 | Chung | |
| 10,057,157 B2 | 8/2018 | Goliya et al. | |
| 10,063,419 B2 | 8/2018 | Horstmann et al. | |
| 10,122,632 B2 | 11/2018 | Trossen et al. | |
| 10,142,353 B2 | 11/2018 | Yadav et al. | |
| 10,142,427 B2 | 11/2018 | Li et al. | |
| 10,176,341 B2 | 1/2019 | Spaulding et al. | |
| 10,187,485 B1 | 1/2019 | Shavell et al. | |
| 10,205,663 B1 | 2/2019 | Jones et al. | |
| 10,237,175 B2 | 3/2019 | Pignataro et al. | |
| 10,255,445 B1 | 4/2019 | Brinskelle | |
| 10,270,878 B1 | 4/2019 | Uppal et al. | |
| 10,284,578 B2 | 5/2019 | Brugger et al. | |
| 10,284,595 B2 | 5/2019 | Reddy et al. | |
| 10,289,857 B1 | 5/2019 | Brinskelle | |
| 10,291,417 B2 | 5/2019 | Vucina et al. | |
| 10,296,558 B1 | 5/2019 | McInerny | |
| 10,305,776 B2 | 5/2019 | Horn et al. | |
| 10,326,735 B2 | 6/2019 | Jakobsson et al. | |
| 10,331,769 B1 | 6/2019 | Hill et al. | |
| 10,348,639 B2 | 7/2019 | Puchala et al. | |
| 10,349,304 B2 | 7/2019 | Kim et al. | |
| 10,355,973 B2 | 7/2019 | Cicic et al. | |
| 10,439,926 B2 | 10/2019 | Horn et al. | |
| 10,440,503 B2 | 10/2019 | Tapia | |
| 10,498,693 B1 | 12/2019 | Strauss et al. | |
| 10,530,697 B2 | 1/2020 | Fourie et al. | |
| 10,599,462 B2 | 3/2020 | Fried-Gintis | |
| 10,601,787 B2 | 3/2020 | Pritikin et al. | |
| 10,635,512 B2 | 4/2020 | Pepin et al. | |
| 10,652,047 B2 | 5/2020 | Jain et al. | |
| 10,708,125 B1 | 7/2020 | Chen | |
| 2002/0078382 A1 | 6/2002 | Sheikh et al. | |
| 2002/0120599 A1 | 8/2002 | Knouse et al. | |
| 2003/0145225 A1 | 7/2003 | Bruton et al. | |
| 2003/0145226 A1 | 7/2003 | Bruton et al. | |
| 2003/0169724 A1 | 9/2003 | Mehta et al. | |
| 2003/0188189 A1 | 10/2003 | Desai et al. | |
| 2004/0146006 A1* | 7/2004 | Jackson | H04L 43/00 370/230 |
| 2005/0027782 A1 | 2/2005 | Jalan et al. | |
| 2005/0102266 A1 | 5/2005 | Nason et al. | |
| 2005/0105608 A1 | 5/2005 | Coleman et al. | |
| 2005/0138402 A1 | 6/2005 | Yoon et al. | |
| 2005/0207405 A1 | 9/2005 | Dowling | |
| 2005/0273850 A1 | 12/2005 | Freund | |
| 2006/0018466 A1* | 1/2006 | Adelstein | H04L 63/1491 380/46 |
| 2006/0085543 A1 | 4/2006 | Hrastar et al. | |
| 2006/0221967 A1 | 10/2006 | Narayan et al. | |
| 2008/0082722 A1 | 4/2008 | Savagaonkar et al. | |
| 2008/0320556 A1* | 12/2008 | Lee | G06F 21/554 726/2 |
| 2009/0175211 A1 | 7/2009 | Jakobsen | |
| 2009/0241197 A1* | 9/2009 | Troyansky | H04L 63/0236 726/26 |
| 2009/0249466 A1 | 10/2009 | Motil et al. | |
| 2009/0254572 A1 | 10/2009 | Redlich et al. | |
| 2009/0296685 A1 | 12/2009 | O'Shea et al. | |
| 2009/0307600 A1 | 12/2009 | Arthur et al. | |
| 2010/0010968 A1 | 1/2010 | Redlich et al. | |
| 2011/0169844 A1 | 7/2011 | Diard et al. | |
| 2012/0324365 A1 | 12/2012 | Momchilov et al. | |
| 2013/0034097 A1 | 2/2013 | Dharmapurikar et al. | |
| 2013/0080641 A1 | 3/2013 | Lui et al. | |
| 2013/0091214 A1 | 4/2013 | Kellerman et al. | |
| 2013/0120411 A1 | 5/2013 | Swift et al. | |
| 2013/0231084 A1 | 9/2013 | Raleigh | |
| 2013/0275574 A1 | 10/2013 | Hugard, IV et al. | |
| 2013/0298192 A1 | 11/2013 | Kumar et al. | |
| 2013/0340029 A1 | 12/2013 | De Armas et al. | |
| 2014/0032759 A1 | 1/2014 | Barton et al. | |
| 2014/0082726 A1 | 3/2014 | Dreller et al. | |
| 2014/0109174 A1 | 4/2014 | Barton et al. | |
| 2014/0146062 A1 | 5/2014 | Kiel et al. | |
| 2014/0207850 A1 | 7/2014 | Bestler et al. | |
| 2014/0237594 A1 | 8/2014 | Thakadu et al. | |
| 2014/0280517 A1 | 9/2014 | White et al. | |
| 2014/0379812 A1 | 12/2014 | Bastide, II et al. | |
| 2015/0066896 A1 | 3/2015 | Davis et al. | |
| 2015/0067832 A1 | 3/2015 | Sastry | |
| 2015/0134730 A1 | 5/2015 | Seedorf et al. | |
| 2015/0220707 A1 | 8/2015 | Kline et al. | |
| 2015/0264035 A1 | 9/2015 | Waterhouse et al. | |
| 2015/0264049 A1 | 9/2015 | Achilles et al. | |
| 2015/0288714 A1 | 10/2015 | Emigh et al. | |
| 2015/0381641 A1 | 12/2015 | Cabrera et al. | |
| 2016/0042179 A1 | 2/2016 | Weingarten et al. | |
| 2016/0055334 A1 | 2/2016 | Herwono et al. | |
| 2016/0080397 A1* | 3/2016 | Bacastow | H04L 63/20 726/1 |
| 2016/0094645 A1 | 3/2016 | Ashutosh et al. | |
| 2016/0103992 A1* | 4/2016 | Roundy | G06F 21/554 726/23 |
| 2016/0212012 A1 | 7/2016 | Young et al. | |
| 2016/0352719 A1 | 12/2016 | Yu | |
| 2016/0378409 A1* | 12/2016 | Muramatsu | G06F 3/1238 358/1.14 |
| 2017/0061345 A1* | 3/2017 | Jones, III | G06Q 50/01 |
| 2017/0126587 A1 | 5/2017 | Ranns et al. | |
| 2017/0126718 A1* | 5/2017 | Baradaran | H04L 63/0281 |
| 2017/0134506 A1 | 5/2017 | Rotem et al. | |
| 2017/0149795 A1 | 5/2017 | Day, II | |
| 2017/0214705 A1 | 7/2017 | Gupta | |
| 2017/0237779 A1* | 8/2017 | Seetharaman | H04L 63/30 726/30 |
| 2017/0244729 A1 | 8/2017 | Fahrny et al. | |
| 2017/0264628 A1* | 9/2017 | Treat | H04L 63/0227 |
| 2017/0302665 A1* | 10/2017 | Zou | H04L 67/306 |
| 2018/0012144 A1 | 1/2018 | Ding et al. | |
| 2018/0115613 A1 | 4/2018 | Vajravel et al. | |
| 2018/0152471 A1 | 5/2018 | Jakobsson | |
| 2018/0165463 A1 | 6/2018 | McCreary et al. | |
| 2018/0173453 A1* | 6/2018 | Danilov | G06F 3/0649 |
| 2018/0234368 A1 | 8/2018 | Everton | |
| 2018/0330257 A1* | 11/2018 | Dodson | H04L 63/1416 |
| 2018/0375760 A1 | 12/2018 | Saavedra | |
| 2019/0037029 A1 | 1/2019 | Border | |
| 2019/0057200 A1 | 2/2019 | Sabag et al. | |
| 2019/0075124 A1 | 3/2019 | Kimhi et al. | |
| 2019/0182213 A1 | 6/2019 | Saavedra et al. | |
| 2019/0199745 A1 | 6/2019 | Jakobsson et al. | |
| 2019/0278760 A1 | 9/2019 | Smart | |
| 2019/0342313 A1 | 11/2019 | Watkiss et al. | |
| 2019/0354709 A1 | 11/2019 | Brinskelle | |
| 2019/0378102 A1 | 12/2019 | Kohli | |
| 2020/0007548 A1 | 1/2020 | Sanghavi et al. | |
| 2020/0021515 A1 | 1/2020 | Michael et al. | |
| 2020/0021684 A1 | 1/2020 | Kreet et al. | |
| 2020/0196092 A1 | 6/2020 | Jones | |
| 2020/0314002 A1 | 10/2020 | Benoist et al. | |
| 2020/0314004 A1 | 10/2020 | Rashad et al. | |

OTHER PUBLICATIONS symantec.com, Which tuning is available for improving the performance of Symantec Endpoint Protection clients during scan, https://support.symantec.com/en_US/article.TECH143941.html, Jan. 6, 2011.
microsoft.com, Windows Search Overview, https://msdn.microsoft.

(56) References Cited

OTHER PUBLICATIONS com/en-us/library/windows/desktop/aa965362, printed Nov. 20, 2017.
Stephen G. Dimmock et al., Is Fraud Contagious? Co-Worker Influence on Misconduct by Financial Advisers, The Journal of Finance, first published online Feb. 3, 2018.
mybluelinux.com, What is email envelope and email header, downloaded Jan. 16, 2020.
Check Point Software Technologies LTD., Firewall and SmartDefense, Version NGX R62, 702048, Sep. 25, 2006.
Check Point Software Technologies LTD., Softwareblades, Firewall R75.40, Administration Guide, Nov. 30, 2014.
Fortinet, FortiOS Handbook—Firewall, version 5.2.0, May 5, 2017.
Wikipedia, IP Address Spoofing, printed Aug. 16, 2017.
David Davis, Techrepublic, Prevent IP Spoofing with the Cisco IOS, Mar. 14, 2007.
evostream.com, Media Server and Video Streaming Software, https://evostream.com/#, printed Feb. 22, 2018.
wowza.com, Wowza Streaming Engine, https://www.wowza.com/products/streaming-engine, printed Feb. 22, 2018.
opencv.org, https://opencv.org/, printed Mar. 6, 2018.
stackoverflow.com, OpenCV Crop Live Feed from Camera, https://stackoverflow.com/questions/17352420/opencv-crop-live-feed-from-camera, printed Feb. 22, 2018.
Papadopoulos et al., An error control scheme for large-scale multicast applications, Proceedings, IEEE INFOCOM '98, the Conference on Computer Communications; Mar. 29-Apr. 2, 1998.
Schmidt et al., AuthoCast: a protocol for mobile multicast sender authentication, Proceeding, MoMM '08 Proceedings of the 6th International Conference on Advanced in Mobile Computing and Multimedia, pp. 142-149, 2008.
Baker F., "Requirements for IP Version 4 Routers," RFC 1812, Jun. 1995. (Year: 1995).
Nichols et al., "Definition of the Differentiated Services Field (DS field) in the IPv4 and IPv6 Headers," RFC 2474, Dec. 1998. (Year: 1998).
Fuller et al., "Classless Inter-Domain Routing (CIDR): The Internet Address Assignment and Aggregation Plan," RFC 4632, Aug. 2006. (Year: 2006).
Hinden, R., "Applicability Statement for the Implementation of Classless Inter-Domain Routing (CIDR)," RFC 1517, Internet Engineering Steering Group, Sep. 1993. (Year: 1993).
Grossman, D., "New Terminology and Clarifications for Diffserv," RFC 3260, Apr. 2002. (Year: 2002).
Arkko J. et al., "IPv4 Address Blocks Reserved for Documentation," RFC 5737, Jan. 2010. (Year: 2010).
Cotton, M. et al., "Special Purpose IP Address Registries," RFC 6890, Apr. 2013. (Year: 2013).
Housley, R. et al., "The Internet Numbers Registry System," RFC 7020, Aug. 2013. (Year: 2013).
github.com, Gnome Mutter desktop manager, https://github.com/GNOME/mutter, downloaded Feb. 1, 2019.
github.com, SimpleScreenRecorder, https://github.com/MaartenBaert/ssr, downloaded Feb. 1, 2019.
Zscaler, About Virtual ZENs, downloaded Apr. 4, 2019.
Splunk, Adaptive Operations Framework, printed Jan. 29, 2020 https://www.splunk.com/en_us/solutions/solution-areas/security-and-fraud/adaptive-response-initiative.html.

* cited by examiner

SYSTEM IDENTIFYING INGRESS OF PROTECTED DATA TO MITIGATE SECURITY BREACHES

BACKGROUND OF THE INVENTION

Field of the Invention

The present invention relates in general to the field of computers and similar technologies, and in particular to software utilized in this field. Still more particularly, it relates to a method, system and computer-usable medium for a system for identifying and analyzing the ingress of protected data to mitigate security breaches.

Description of the Related Art

In an effort to protect data stored in a network, many security systems implement document loss prevention (DLP) policies. To this end, security systems monitor egress channels from the secured network to prevent movement of protected data outside of the secured network. For example, the security system may deny transfer of certain documents deemed to include protected data to a device that could be used outside the company. Such devices may include, for example, universal serial bus (USB) storage devices or other physically transportable devices that a user may remove from control of the security system.

Notwithstanding the DLP policies implemented by a company, security breaches still occur. There are certain solutions available for detecting whether such breaches have occurred. For example, Dark Web monitoring services are frequently used to search for documents that are tagged as proprietary or confidential to a company. When caches of confidential data are discovered, security personnel within the company typically undertake a manual breach detection process to determine where the security breach occurred. Such manual breach detection processes, however, are often difficult and costly to implement and frequently do not result in an identification of the source of the security breach.

SUMMARY OF THE INVENTION

A method, system and computer-usable medium are disclosed for mitigating security breaches associated with dissemination of protected data. In certain embodiments, the method includes receiving information communicated to a secured network from a source external to the secured network and determining whether the received information includes protected data. If the received information includes protected data, a determination is made as to whether the receipt of the protected data is anomalous. If the receipt of the protected data is anomalous, one or more sources of egress of the protected data from the secured network are identified. By identifying the sources of egress, actions may be taken to prevent future egress of the protected data.

In certain embodiments, the receipt of the protected data is determined to be anomalous when the external source is not authorized to access the protected data. In certain embodiments, the receipt of the protected data is determined to be anomalous when the external source utilizes an unauthorized device to electronically communicate the protected data to the secured network. In certain embodiments, the receipt of protected data is determined to be anomalous when there are no identifiable sources of egress of the protected data from the secured network.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
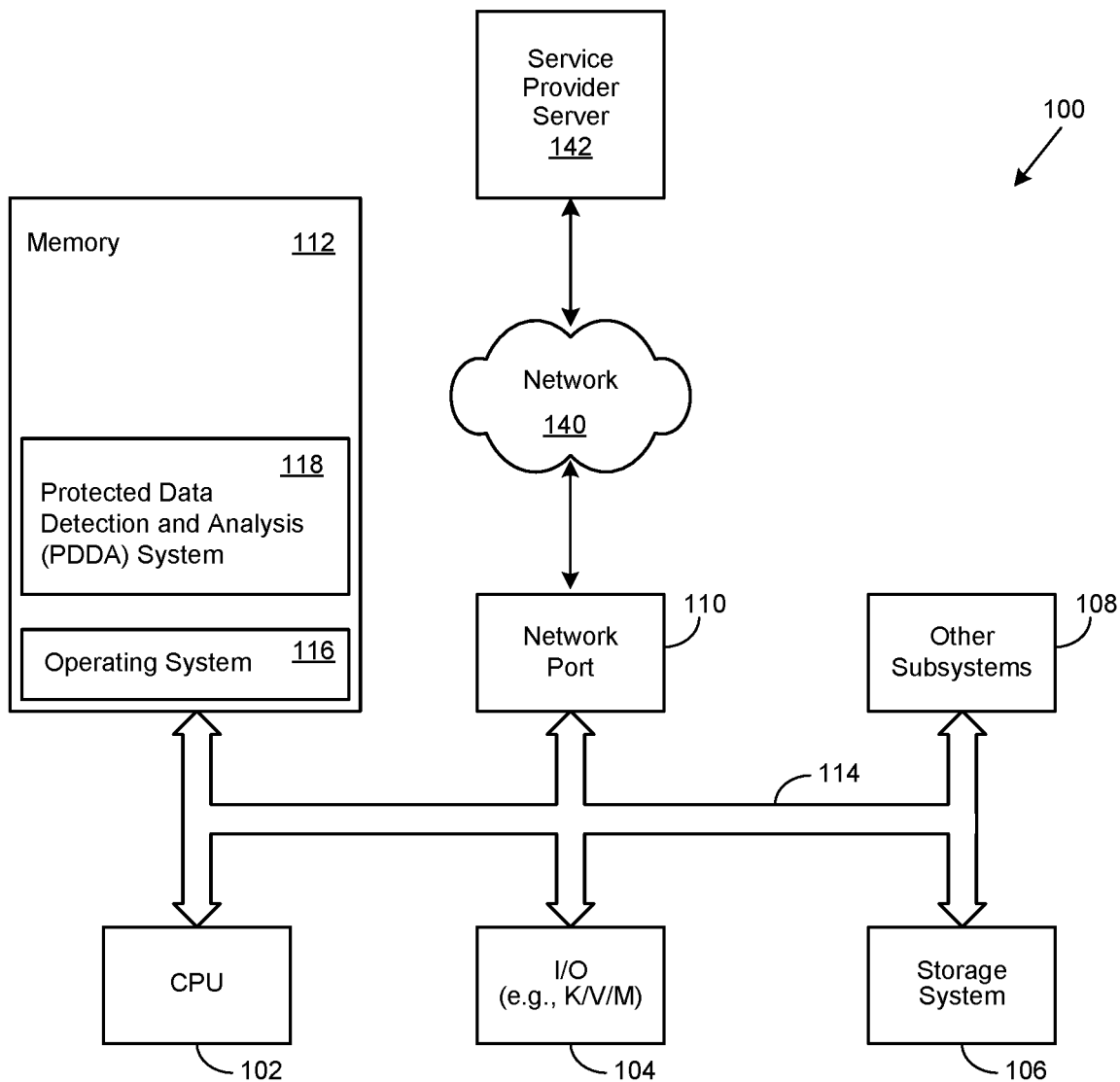
FIG. 1 depicts a generalized illustration of an information handling system that can implement certain embodiments of the system and method of the present invention.

A method, system and computer-usable medium for analyzing electronic information communicated to a secure network from a source external to the secured network to mitigate security breaches associated with dissemination of protected data are disclosed. As used herein, a secure network is any network that includes an electronic security system that implements security policies to avoid and keep track of unauthorized access, exploitation, modification, or denial of the network and network resources.

Certain aspects of the invention reflect an appreciation that electronic information data ingress to a secured network from an external source may include protected data that was provided to or otherwise accessed by a third-party in violation of the company's security policies or as a result of other activities that may have placed the protected data at risk of access through unprotected channels. As used herein, protected data includes any data over which an entity exercises controlled access and does not make available to the general public and may include, for example, proprietary files, proprietary documents, and other proprietary information over which the entity wishes to exercise control. For purposes of the following discussion, the entity will be referred to as the "company", but may be any public or private entity.

In certain implementations, a security system monitors and logs a user's right to access as well as actual accesses of protected data. Certain aspects of the present invention recognize that this provides a company with the records showing the movements of the protected data within the secured network as well as transmission of protected information out of the secured network to third parties. Certain aspects of the invention recognize that records generated by the security system may be used to identify one or more sources of egress of the protected data from the secured network and thereby discover where a company must focus its security efforts to prevent future exfiltrations of protected data. In certain implementations of this approach, protected data found outside the company is correlated with records of data movements of the protected data within the company to provide rapid identification of unsecured dissemination of the protected data as well as rapid mitigation against future losses.

In one example, it is assumed that a document tagged as having protected data enters the company from a source external to the secured network. When such a document is received, one or more of the following events may have occurred: 1) the document is incorrectly tagged as including protected data; 2) the document is genuine and was disseminated in a broken business process not included in security policy rules; 3) the document previously left the company in accordance with security policy rules and is now re-entering the company; and 4) the document previously left the company in violation of security policy rules, but was either undetected, incorrectly allowed to leave, or not scanned at all.

In event (1), detecting that the document has been incorrectly tagged is useful in terms of threat intelligence. Confidence that the document has been incorrectly tagged may be obtained by determine whether the document is identical to or very similar to a document that already exists inside the company. This comparison, in turn, may be used to determine whether the document indeed includes protected data. If protected data is not included in the document, the company may need not focus its efforts in investigating channels of egress of the incorrectly tagged document.

In event (2), it is assumed that the protected data has been created externally to the company and subsequently ingested. In this case, the business processes in which the protected data was disseminated and used by business partners should be discovered and documented. In certain instances, the business processes may include face-to-face meetings or electronic conferences with third parties, such as business partners, customers, or clients in which protected data may have been disseminated. Such processes may be legitimate, but need to be understood to ensure the integrity of the security policies. In certain instances, it may be necessary to ensure that the third party has put in place adequate security policies to prevent unauthorized access of the protected information once the protected information has been given to the third party. In some instances, a third party's failure to enforce security policies sufficient to protect the protected data within its own organization may result in access or dissemination of the protected data by, for example, the company's competitors or the Dark web.

In event (3) there may be business processes which legitimately sent documents containing protected data out of the company. For example, collaboration with an outside legal counsel frequently involves communications including protected data, such as protected files. In such instances, the company expects that communications from the outside legal counsel will include protected data. Accordingly, rules may be written to handle this inbound case. For example, security policy rules may be written to prevent scanning communications received from the external legal counsel for protected data. Additionally, or on the alternative, security policies may be written so that receipt of protected data from the outside legal counsel is treated as a normal receipt of protected data without flagging it is anomalous or otherwise suspicious.

In event (4), users of the secured system may have intentionally or incidentally allowed dissemination of protected information by violating the company's security policies. For example, a user of the secured network may have set up a small cloud server for the user's personal use. The intent of the user might not be malicious, but in creating this site, the user may have inadvertently put protected data at risk of unauthorized access. In certain instances, the user may have stored protected files in the cloud server for work purposes so that the protected files are accessible by the user when outside the company using, for example, an unsecured bring your own device (BYOD). If the user's account on the cloud server is hacked, the hacker will have unauthorized access to the protected files. Similarly, any connection between the user and the Web application, even if run on a device within the secured network, provides a channel of egress of protected data stored on the secured network since a malicious third party may exploit the connection to access protected data on the secured network. If protected data is detected entering the company, records of the security system showing communication between the user and the user' cloud account may be used to identify the cloud account is a potential egress channel of the protected data.

Certain aspects of the invention also recognize that user behaviors may be used in the investigation of identified exfiltrations. In certain examples, the security system may identify multiple users that have accessed the protected data. The company may prioritize investigation of potential security breaches by the identified users based on user risk behaviors, where users having high risk behavior factors are investigated before those having lower risk behavior factors. In certain embodiments, prioritization may be based on user risk behaviors existing at the time at which the user actually accessed the protected data. In certain embodiments, prioritization may be based on user risk behaviors existing at the time of the investigation. In certain embodiments, prioritization may be based on a change in user behaviors over time. By employing user risk behaviors in the investigative process, the company may focus its investigated efforts to discover the source of the egress of the protected data sooner and/or with fewer resources than would otherwise be possible if the individual users were investigated on an ad hoc basis.

As used herein, a computer system broadly includes an information handling system and includes corresponding hardware or software. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a mobile device such as a tablet or smartphone, a connected "smart device," a network appliance, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more storage systems, one or more network ports for communicating externally, and various input and output (I/O) devices, such as a keyboard, a mouse, and a graphics display.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or solid state drive), a sequential access storage device (e.g., a tape disk drive), optical storage device, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, and associated controllers, a storage system 106, and various other subsystems 108. In various embodiments, the information handling system 100 also includes network port 110 operable to connect to a secured network 140, which is likewise accessible by a service provider server 142. The information handling system 100 likewise includes system memory 112, which is interconnected to the foregoing via one or more buses 114. System memory 112 further includes operating system (OS) 116 and in various embodiments may also include a protected data detection and analysis (PDDA) system 118 that is configured to identify incoming protected data and facilitate identification of sources of egress of that protected data that occurred in violation of a company's security policies. In one embodiment, the information handling system 100 is able to download the PDDA system 118 from the service provider server 142. In another embodiment, the PDDA system 118 is provided as a service from the service provider server 142.

In various embodiments, the PDDA system 118 performs a system security analysis operation, which improves processor efficiency, and thus the efficiency of the information handling system 100, by analyzing anomalous communications of protected data to the information processing system 100 from an external source and facilitating detection and identification of sources of egress of the protected data that may have occurred in violation of the company's security policies. As will be appreciated, once the information handling system 100 is configured to perform the information detection and analysis operations, the information handling system 100 becomes a specialized computing device specifically configured to perform the information detection and analysis operations and is not a general purpose computing device. Moreover, the implementation of the PDDA system 118 on the information handling system 100 improves the functionality of the information handling system 100 and provides a useful and concrete result of analyzing communications received by the information handling system 100 to identify and mitigate breaches of a company's security policies.

Figure 2:
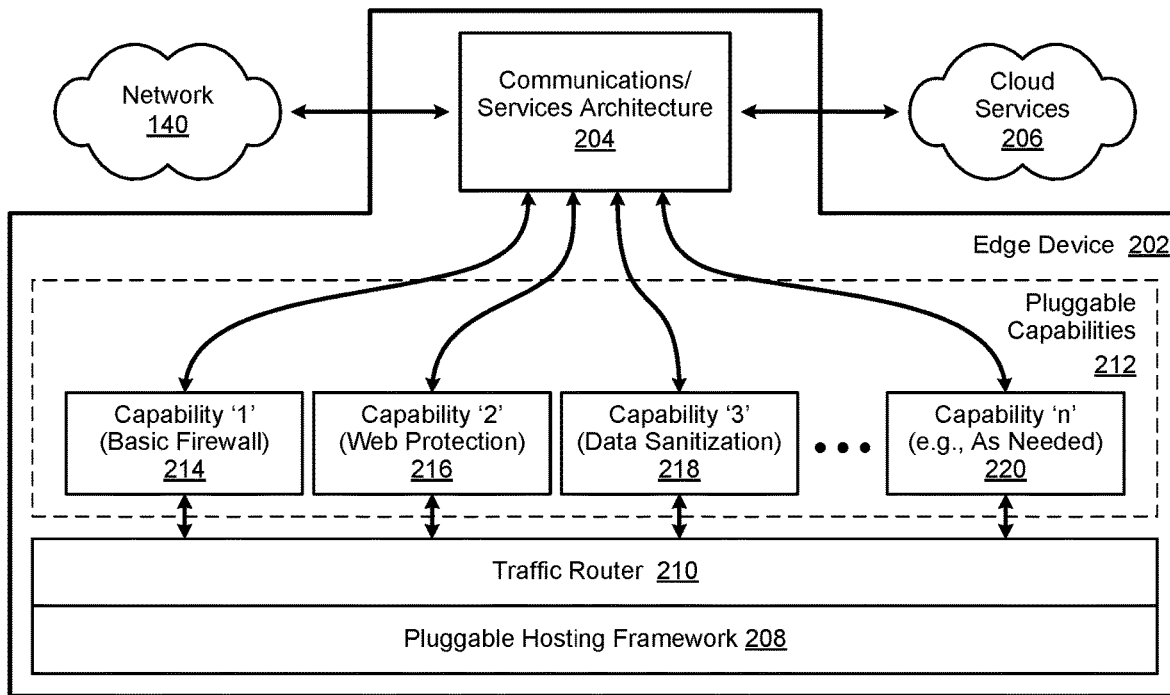
FIG. 2 is a simplified block diagram of one embodiment of an edge device.

FIG. 2 is a simplified block diagram of an edge device that may be employed in certain embodiments of the invention. As used herein, an edge device, such as the edge device 202 shown in FIG. 2, broadly refers to a device providing an entry point into a network 140. Examples of such edge devices 202 may include routers, routing switches, integrated access devices (IADs), multiplexers, wide area network (WAN) access devices, and network security appliances. In certain embodiments, the network 140 may be a private network (e.g., an enterprise network), a semi-public network (e.g., a service provider core network), or a public network (e.g., the Internet). In certain embodiments, a source may be considered to be exterior to the secured network when the received information is received from the source at the edge device 202.

Skilled practitioners of the art will be aware that edge devices 202 are often implemented as routers that provide authenticated access to faster, more efficient backbone and core networks. Furthermore, current industry trends include making edge devices 202 more intelligent, which allows core devices to operate at higher speed as they are not burdened with additional administrative overhead. Accordingly, such edge devices 202 often include Quality of Service (QoS) and multi-service functions to manage different types of traffic. Consequently, it is common to design core networks with switches that use routing protocols such as Open Shortest Path First (OSPF) or Multiprotocol Label Switching (MPLS) for reliability and scalability. Such approaches allow edge devices 202 to have redundant links to the core network, which not only provides improved reliability, but enables enhanced, flexible, and scalable security capabilities as well.

In certain embodiments, the edge device 202 may be implemented to include a communications/services architecture 204, various pluggable capabilities 212, a traffic router 210, and a pluggable hosting framework 208. In certain embodiments, the communications/services architecture 202 may be implemented to provide access to and from various networks 140, cloud services 206, or a combination thereof. In certain embodiments, the cloud services 206 may be provided by a cloud infrastructure familiar to those of skill in the art. In certain embodiments, the edge device 202 may be implemented to provide support for a variety of generic services, such as directory integration, logging interfaces, update services, and bidirectional risk/context flows associated with various analytics. In certain embodiments, the edge device 202 may be implemented to provide temporal information associated with the provision of such services.

In certain embodiments, the edge device 202 may be implemented as a generic device configured to host various network communications, data processing, and security management capabilities. In certain embodiments, the pluggable hosting framework 208 may be implemented to host such capabilities in the form of pluggable capabilities 212. In certain embodiments, the pluggable capabilities 212 may include capability '1' 214 (e.g., basic firewall), capability '2' 216 (e.g., general web protection), capability '3' 218 (e.g., data sanitization), and so forth through capability 'n' 220, which may include capabilities needed for a particular operation, process, or requirement on an eight basis. In certain embodiments, such operations may include the provision of associated temporal information (e.g., time stamps).

In certain embodiments, the pluggable capabilities 212 may be sourced from various cloud services 206. In certain embodiments, the pluggable hosting framework 208 may be implemented to provide certain computing and communication infrastructure components, and foundation capabilities, required by one or more of the pluggable capabilities 212. In certain embodiments, the pluggable hosting framework 208 may be implemented to allow the pluggable capabilities 212 to be dynamically invoked. Skilled practitioners of the art will recognize that many such embodiments are possible. Accordingly, the foregoing is not intended to limit the spirit, scope or intent of the invention.

Figure 3:
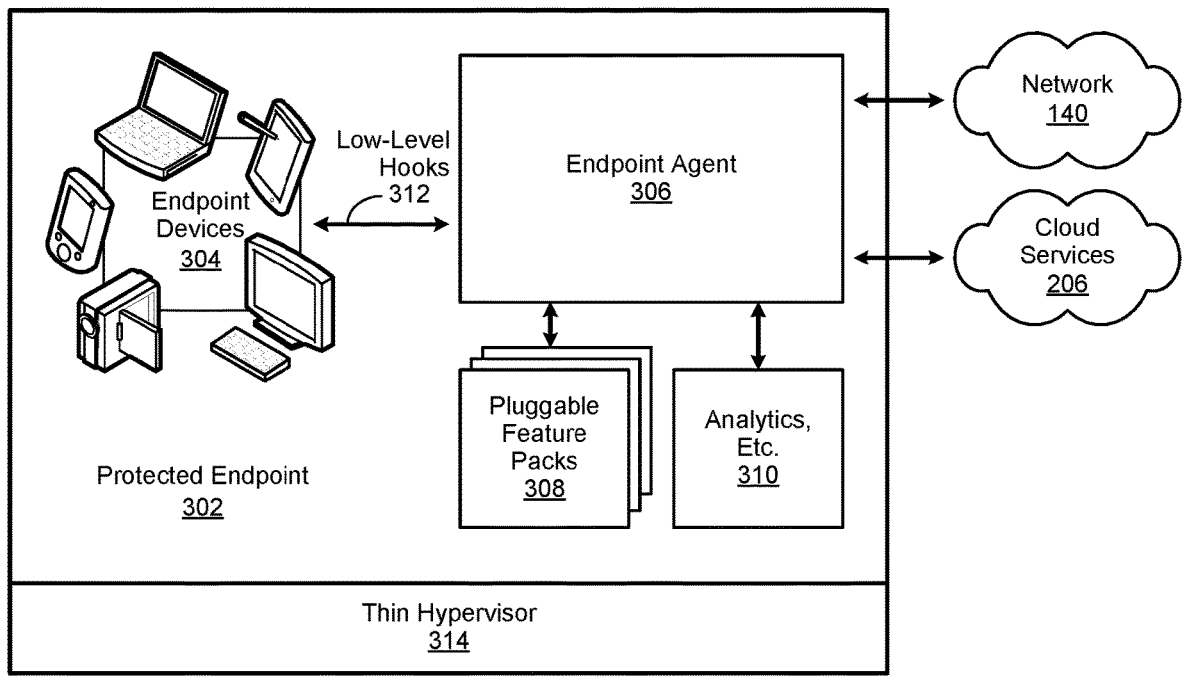
FIG. 3 is a simplified block diagram of one embodiment of an endpoint agent.

FIG. 3 is a simplified block diagram of an endpoint agent that may be used in certain embodiments of the invention. As used herein, an endpoint agent 306 broadly refers to a software agent used in combination with an endpoint device 304 to establish a protected endpoint 302. Skilled practitioners of the art will be familiar with software agents, which are computer programs that perform actions on behalf of a user or another program. In various approaches, a software agent may be autonomous or work together with another agent or a user. In certain of these approaches the software agent is implemented to autonomously decide if a particular action is appropriate for a given event, such as an observed user behavior.

An endpoint device 304, as likewise used herein, refers to an information processing system such as a personal computer, a laptop computer, a tablet computer, a personal digital assistant (PDA), a smart phone, a mobile telephone, a digital camera, a video camera, or other device that is capable of storing, processing and communicating data. In certain embodiments, the communication of the data may take place in real-time or near-real-time. As used herein, real-time broadly refers to processing and providing information within a time interval brief enough to not be discernable by a user. As an example, a cellular phone conversation may be used to communicate information in real-time, while an instant message (IM) exchange may be used to communicate information in near real-time. In certain embodiments, the communication of the information may take place asynchronously. For example, an email message may be stored on an endpoint device 304 when it is offline. In this example, the information may be communicated to its intended recipient once the endpoint device 304 gains access to a network 140.

A protected endpoint 302, as likewise used herein, broadly refers to a policy-based approach to network security that typically requires endpoint devices 304 to comply with particular criteria before they are granted access to network resources. As an example, a given endpoint device 304 may be required to have a particular operating system (OS), or version thereof, a Virtual Private Network (VPN) client, anti-virus software with current updates, and so forth. In various embodiments, the protected endpoint 302 may be implemented to perform operations associated with analyzing the probability distribution of features associated with certain interrelated events. In various embodiments, the protected endpoint 302 may be implemented to collect and provide certain information associated with an event. In certain embodiments, the protected endpoint 302 may be implemented to provide temporal information, such as timestamp information, associated with such operations. In certain embodiments, a source is considered exterior to the secured network when the received information is from an endpoint device 304.

In certain embodiments, the endpoint agent 306 may be implemented to universally support a variety of operating systems, such as Apple Macintosh®, Microsoft Windows®, Linux®, Android® and so forth. In certain embodiments, the endpoint agent 306 may be implemented to interact with the endpoint device 304 through the use of low-level hooks 312 at the OS level. It will be appreciated that the use of low-level hooks 312 allows the endpoint agent 306 to subscribe to multiple events through a single hook. Consequently, multiple functionalities provided by the endpoint agent 306 can share a single data stream, using only those portions of the data stream they may individually need. Accordingly, system efficiency can be improved and operational overhead reduced.

In certain embodiments, the endpoint agent 306 may be implemented to provide a common infrastructure for pluggable feature packs 308. In various embodiments, the pluggable feature packs 308 may provide certain security management functionalities. Examples of such functionalities may include various anti-virus and malware detection, data loss protection, insider threat detection, and so forth. In certain embodiments, the security management functionalities may include one or more functionalities associated with analyzing probability distributions of interrelated event features in real-time, as described in greater detail herein.

In certain embodiments, a particular pluggable feature pack 308 may be invoked as needed by the endpoint agent 306 to provide a given functionality. In certain embodiments, individual features of a particular pluggable feature pack 308 are invoked as needed. It will be appreciated that the ability to invoke individual features of a pluggable feature pack 308, without necessarily invoking all such features, will likely improve the operational efficiency of the endpoint agent 306 while simultaneously reducing operational overhead. Accordingly, the endpoint agent 306 can self-optimize in certain embodiments by using the common infrastructure and invoking only those pluggable components that are applicable or needed for a given user behavior.

In certain embodiments, the individual features of a pluggable feature pack 308 may be invoked by the endpoint agent 306 according to the occurrence of a particular user behavior. In certain embodiments, the individual features of a pluggable feature pack 308 may be invoked by the endpoint agent 306 according to the occurrence of a particular event. In certain embodiments, the individual features of a pluggable feature pack 308 may be invoked by the endpoint agent 306 at a particular point in time. In these embodiments, the method by which a given user behavior, event, or point in time is selected is a matter of design choice.

In certain embodiments, the individual features of a pluggable feature pack 308 may be invoked by the endpoint agent 306 according to the context of a particular user behavior or resource access request. As an example, the context may be the user enacting the user behavior, their associated risk classification, which resource they may be requesting, the point in time the user behavior is enacted, and so forth. In certain embodiments, the pluggable feature packs 308 may be sourced from various cloud services 206. In certain embodiments, the pluggable feature packs 308 may be dynamically sourced from various cloud services 206 by the endpoint agent 306 on an as-need basis.

In certain embodiments, the endpoint agent 306 may be implemented with additional functionalities, such as event analytics 310. In certain embodiments, the event analytics 310 functionality may include analysis of various user behaviors that may be used in the investigation of security breaches detected by the information detection and analysis system 118.

Figure 4:
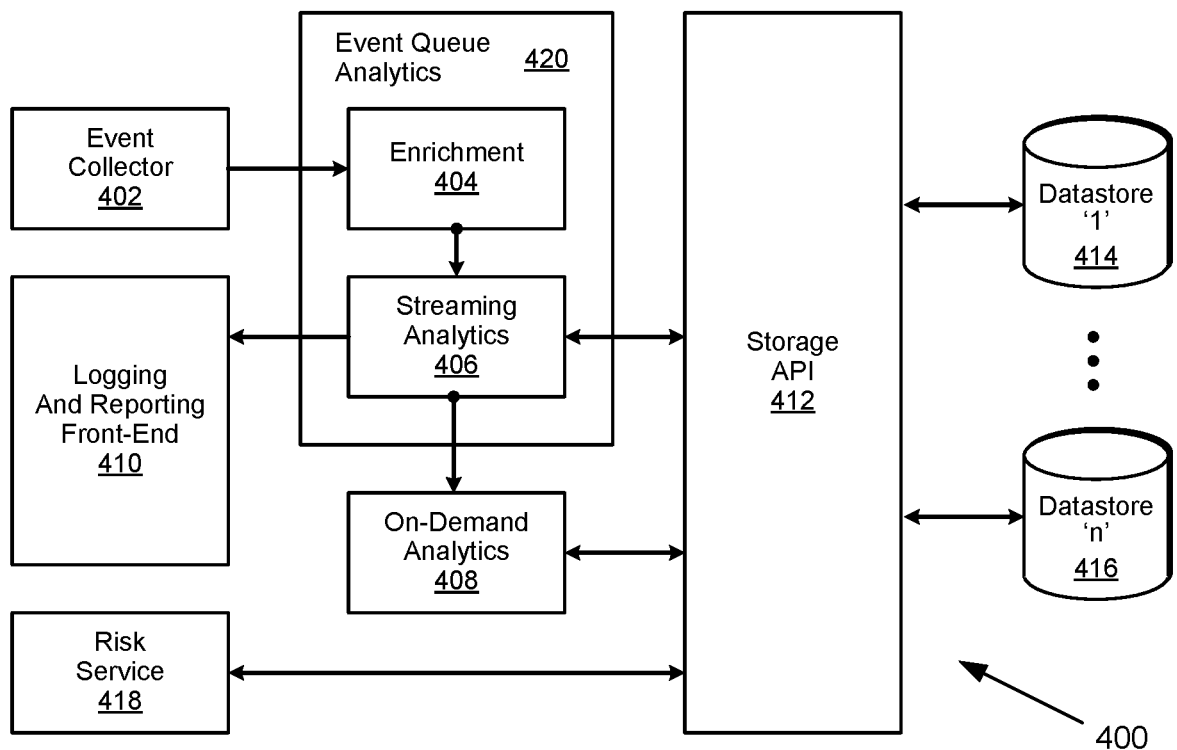
FIG. 4 is a simplified block diagram of one embodiment of a security analytics system.

In certain embodiments, the endpoint agent 306 may be implemented with a thin hypervisor 314, which can be run at Ring −1, thereby providing protection for the endpoint agent 306 in the event of a breach. As used herein, a thin hypervisor broadly refers to a simplified, OS-dependent hypervisor implemented to increase security. As likewise used herein, Ring −1 broadly refers to approaches allowing guest operating systems to run Ring 0 (i.e., kernel) operations without affecting other guests or the host OS. Those of skill in the art will recognize that many such embodiments and examples are possible. Accordingly, the foregoing is not intended to limit the spirit, scope or intent of the invention.

FIG. 4 is a simplified block diagram of a security analytics system 400 that may be used in certain embodiments of the invention. In certain examples, the security analytics system shown in FIG. 4 may be implemented to provide log storage, reporting, and analytics capable of performing streaming 406 and on-demand 408 analytics operations. In certain embodiments, such operations may be associated with defining and managing a user profile. In certain embodiments, the security analytics system may be implemented to provide a uniform platform for storing events and contextual information associated with information communicated to the secured network 140 from an external source. In certain embodiments, the security analytics system may be implemented to provide a uniform platform for storing events and contextual information associated with various user behaviors and performing longitudinal analytics.

As used herein, longitudinal analytics broadly refers to performing analytics of user behaviors occurring over a particular period of time. As an example, a user may iteratively attempt to access certain protected data stored in various locations. In addition, the attempts may occur over a brief period of time. To continue the example, the fact that the information the user is attempting to access is protected data, that it is stored in various locations, and the attempts are occurring in a brief period of time, in combination, may indicate the user behavior enacted by the user is suspicious. As another example, certain entity identifier information (e.g., a user name) associated with a user may change over time. In this example, the change in user name, during a particular period of time or at a particular point in time, may represent suspicious user behavior.

In certain embodiments, the security analytics system may be implemented to detect the presence of protected data in data received from a source external to the secured network and to determine whether the receipt of the protected data from the external source is anomalous. In certain embodiments, the security analytics system may be implemented to store session data associated with an external source when the receipt of the protected data from the external source is anomalous.

In certain embodiments, the security analytics system may be implemented to be scalable. In certain embodiments, the security analytics system may be implemented in a centralized location, such as a corporate data center. In these embodiments, additional resources may be added to the security analytics system as needs grow. In certain embodiments, the security analytics system may be implemented as a distributed system. In these embodiments, the security analytics system may span multiple information processing systems. In certain embodiments, the security analytics system may be implemented in a cloud environment. In certain embodiments, the security analytics system may be implemented in a virtual machine (VM) environment. In such an embodiment, the VM environment may be configured to dynamically and seamlessly scale the security analytics system as needed. Skilled practitioners of the art will recognize that many such embodiments are possible. Accordingly, the foregoing is not intended to limit the spirit, scope or intent of the invention.

In certain embodiments, an event collector 402 may be implemented to collect event and contextual information associated with various user behaviors. In these embodiments, the method by which the event and contextual information collected by the event collector 402 is selected to be collected is a matter of design choice. In certain embodiments, the event and contextual information collected by the event collector 402 may be processed by an enrichment module 404 to generate enriched user behavior information. In certain embodiments, the enrichment may include certain contextual information related to a particular user behavior. In certain embodiments, the enrichment may include certain temporal information, such as timestamp information, related to a particular user behavior. In certain embodiments, the event collector 402 may be implemented to collect event and contextual information associated with electronic information received from an external source pursuant to determining whether the electronic information includes protected data and/or to determine whether receipt of protected data is anomalous.

In certain embodiments, enriched user behavior information may be provided by the enrichment module 404 to a streaming 406 analytics module. In turn, the streaming 406 analytics module may provide some or all of the enriched user behavior information to an on-demand 408 analytics module. As used herein, streaming 406 analytics broadly refers to analytics performed in near real-time on enriched user behavior information as it is received. Likewise, on-demand 408 analytics broadly refers herein to analytics performed, as it is requested, on enriched user behavior information after it has been received. In certain embodiments, the enriched user behavior information may be associated with a particular event. In certain embodiments, the enrichment 404 and streaming analytics 406 modules may be implemented to perform event queue analytics 420 operations, as described in greater detail herein.

In certain embodiments, the on-demand 408 analytics may be performed on enriched user behavior associated with a particular interval of, or point in, time. In certain embodiments, the streaming 406 or on-demand 408 analytics may be performed on enriched user behavior associated with a particular user, group of users, one or more entities, or a combination thereof. In certain embodiments, the streaming 406 or on-demand 408 analytics may be performed on enriched user behavior associated with a particular resource, such as a facility, system, datastore, or service. Those of skill in the art will recognize that many such embodiments are possible. Accordingly, the foregoing is not intended to limit the spirit, scope or intent of the invention.

In certain embodiments, the results of various analytics operations performed by the streaming 406 or on-demand 408 analytics modules may be provided to a storage Application Program Interface (API) 412. In turn, the storage API 412 may be implemented to provide access to various datastores '1' 414 through 'n' 416, which in turn are used to store the results of the analytics operations. In certain embodiments, the security analytics system may be implemented with a logging and reporting front-end 410, which is used to receive the results of analytics operations performed by the streaming 406 analytics module. In certain embodiments, the datastores '1' 414 through 'n' 416 may variously include a datastore of entity identifiers, temporal events, or a combination thereof.

In certain embodiments, the security analytics system may be implemented to provide a risk management service 418. In certain embodiments, the risk management service 418 may be implemented to perform operations associated with defining and managing a user profile. In certain embodiments, the risk management service 418 may be implemented to provide the results of various analytics operations performed by the streaming 406 or on-demand 408 analytics modules. In certain embodiments, the risk management service 418 may be implemented to use the storage API 412 to access various enhanced cyber behavior and analytics information stored on the datastores '1' 414 through 'n' 416, including information relating to resource access requests made by a user using a particular user identity. Skilled practitioners of the art will recognize that many such embodiments are possible. Accordingly, the foregoing is not intended to limit the spirit, scope or intent of the invention.

Figure 5:
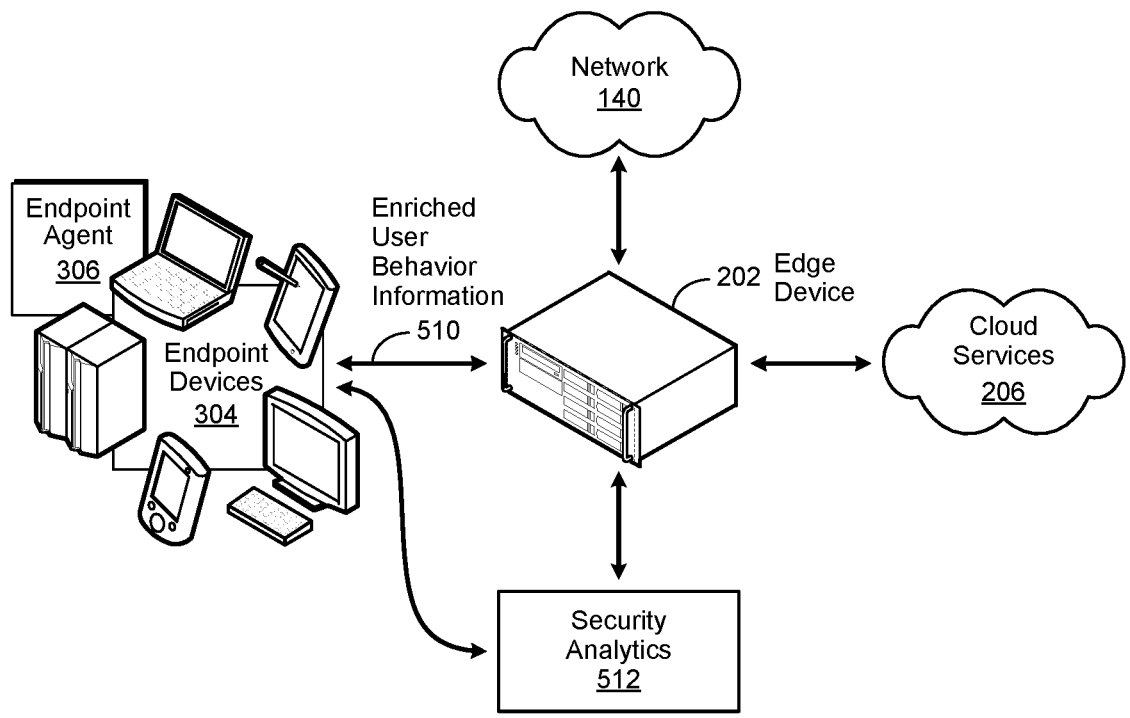
FIG. 5 is a simplified block diagram of an exemplary environment in which a security analytics system may operate.

FIG. 5 is a simplified block diagram of one environment in which a security analytics system 512 may operate. In certain embodiments, the security analytics system 512 may be implemented to determine whether information received from a source external to the secured network includes protected data. In certain embodiments, the security analytics system 512 may determine whether receipt of the protected data from the external source is anomalous. In certain embodiments, the security analytics system 512 may be implemented in combination with one or more endpoint agents 306, one or more edge devices 202, cloud services 206, a security analytics system 512, and a network 140 to perform such operations.

In certain embodiments, the network edge device 202 may be implemented in a bridge, a firewall, or a passive monitoring configuration. In certain embodiments, the edge device 202 may be implemented as software running on an information processing system. In certain embodiments, the network edge device 202 may be implemented to provide integrated logging, updating and control. In certain embodiments, the edge device 202 may be implemented to receive network requests and context-sensitive cyber behavior information in the form of enriched cyber behavior information 510, described in greater detail herein, from an endpoint agent 306, likewise described in greater detail herein.

In certain embodiments, the security analytics system 512 may be implemented as both a source and a sink of user behavior information. In certain embodiments, the security analytics system 512 may be implemented to serve requests for user/resource risk data. In certain embodiments, the edge device 202 and the endpoint agent 306, individually or in combination, may provide certain user behavior information to the security analytics system 512 using either push or pull approaches familiar to skilled practitioners of the art.

In some embodiments, the edge device 202 may be implemented in certain embodiments to receive enriched user behavior information 510 from the endpoint agent 306. It will be appreciated that such enriched user behavior information 510 will likely not be available for provision to the edge device 202 when an endpoint device 304 is not implemented for a corresponding endpoint agent 306. However, the lack of such enriched user behavior information 510 may be accommodated in various embodiments, albeit with reduced functionality related to operations associated with defining and managing a user profile.

In certain embodiments, a given user behavior may be enriched by an associated endpoint agent 306 attaching contextual information to a request. In certain embodiments, the context is embedded within a network request, which is then provided as enriched user behavior information 510. In certain embodiments, the contextual information may be concatenated, or appended, to a request, which in turn may be provided as enriched user behavior information 510. In these embodiments, the enriched user behavior information 510 may be unpacked upon receipt and parsed to separate the request and its associated contextual information. Those of skill in the art will recognize that one possible disadvantage of such an approach is that it may perturb certain Intrusion Detection System and/or Intrusion Detection Prevention (IDS/IDP) systems implemented on a network 140.

In certain embodiments, new flow requests may be accompanied by a contextual information packet sent to the edge device 202. In these embodiments, the new flow requests may be provided as enriched user behavior information 510. In certain embodiments, the endpoint agent 306 may also send updated contextual information to the edge device 202 once it becomes available. As an example, an endpoint agent 306 may share a list of files that have been read by a current process at any point in time once the information has been collected. To continue the example, such a list of files may be used to determine which data the endpoint agent 306 may be attempting to exfiltrate.

In certain embodiments, point analytics processes executing on the edge device 202 may request a particular service. As an example, risk scores on a per-user basis may be requested. In certain embodiments, the service may be requested from the security analytics system 512. In certain embodiments, the service may be requested from various cloud services 206.

In certain embodiments, contextual information associated with a user behavior may be attached to various resource access requests. In certain embodiments, the request may be wrapped and then handled by proxy. In certain embodiments, a small packet of contextual information associated with a user behavior may be sent with a resource access request. In certain embodiments, service requests may be related to Domain Name Service (DNS), web browsing activity, email, and so forth, all of which are essentially requests for service by an endpoint device 304. In certain embodiments, such service requests may be associated with temporal event information. Consequently, such requests can be enriched by the addition of user behavior contextual information (e.g., UserAccount, interactive/automated, data-touched, temporal event information, etc.).

In certain embodiments, the security analytics system 512 may be implemented in different operational configurations. In certain embodiments, the security analytics system 512 may be implemented by using the endpoint agent 306. In certain embodiments, the security analytics system 512 may be implemented by using endpoint agent 306 in combination with the edge device 202. In certain embodiments, the cloud services 206 may likewise be implemented for use by the endpoint agent 306, the edge device 202, and the security analytics system 512, individually or in combination. In these embodiments, the security analytics system 512 may be oriented to determining whether information received from a source external to the secured network 140 includes protected data. In certain embodiments, the security analytics system 512 may also determine whether the receipt of the protected data is anomalous.

In certain embodiments, the endpoint agent 306 may be implemented to update the security analytics system 512 with user behavior and associated contextual information, thereby allowing an offload of certain analytics processing overhead. In certain embodiments, this approach allows for longitudinal risk scoring, which assesses risk associated with certain user behavior during a particular interval of time. In certain embodiments, the security analytics system 512 may be implemented to access risk scores associated with the same user account, but accrued on different endpoint devices 304. It will be appreciated that such an approach may be advantageous when an adversary is "moving sideways" through a network environment, using different endpoint devices 304 to collect information.

Figure 6A:
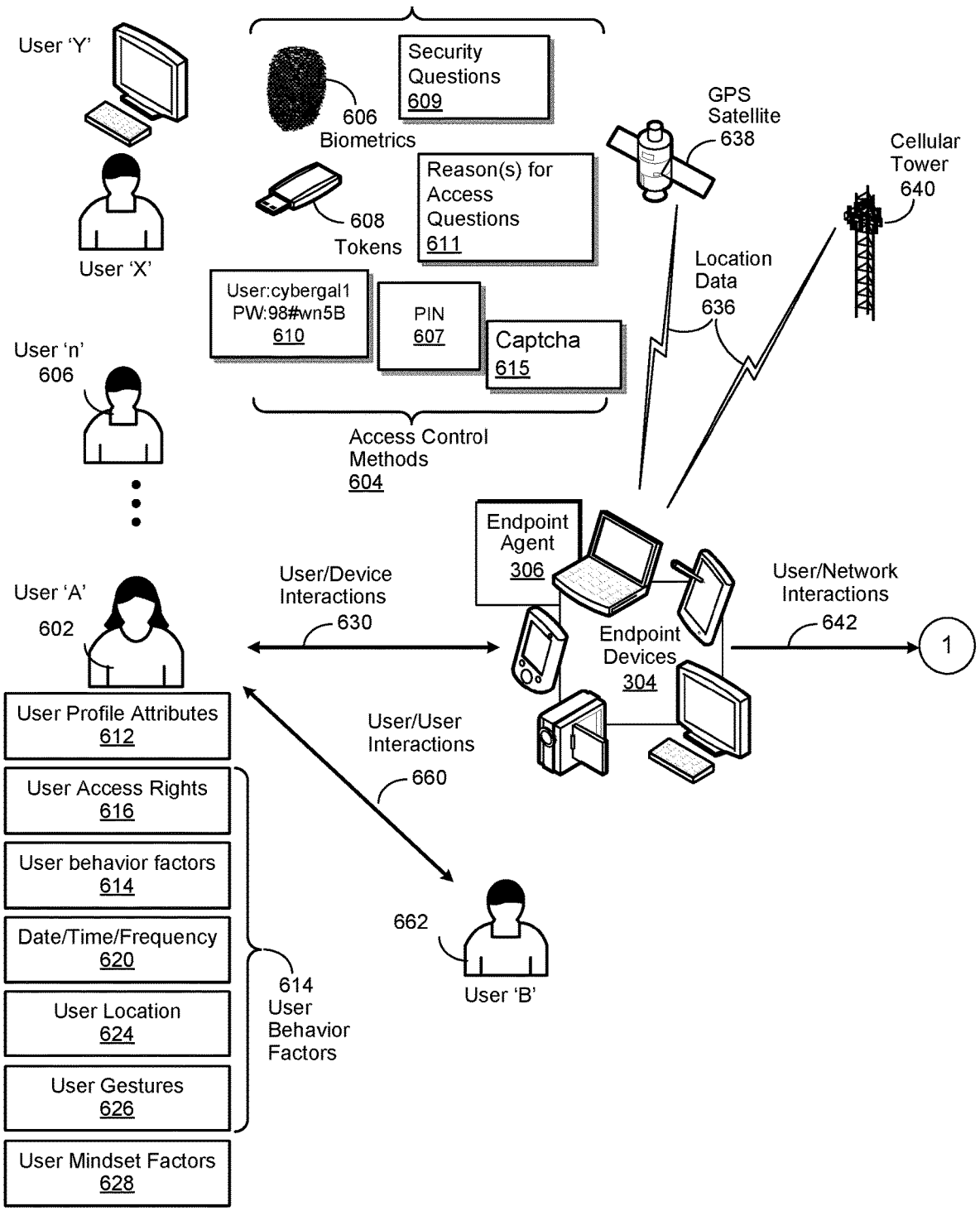
FIGS. 6a and 6b depict a simplified diagram of an exemplary electronic environment employing a protected data detection and analysis system.
Figure 6B:
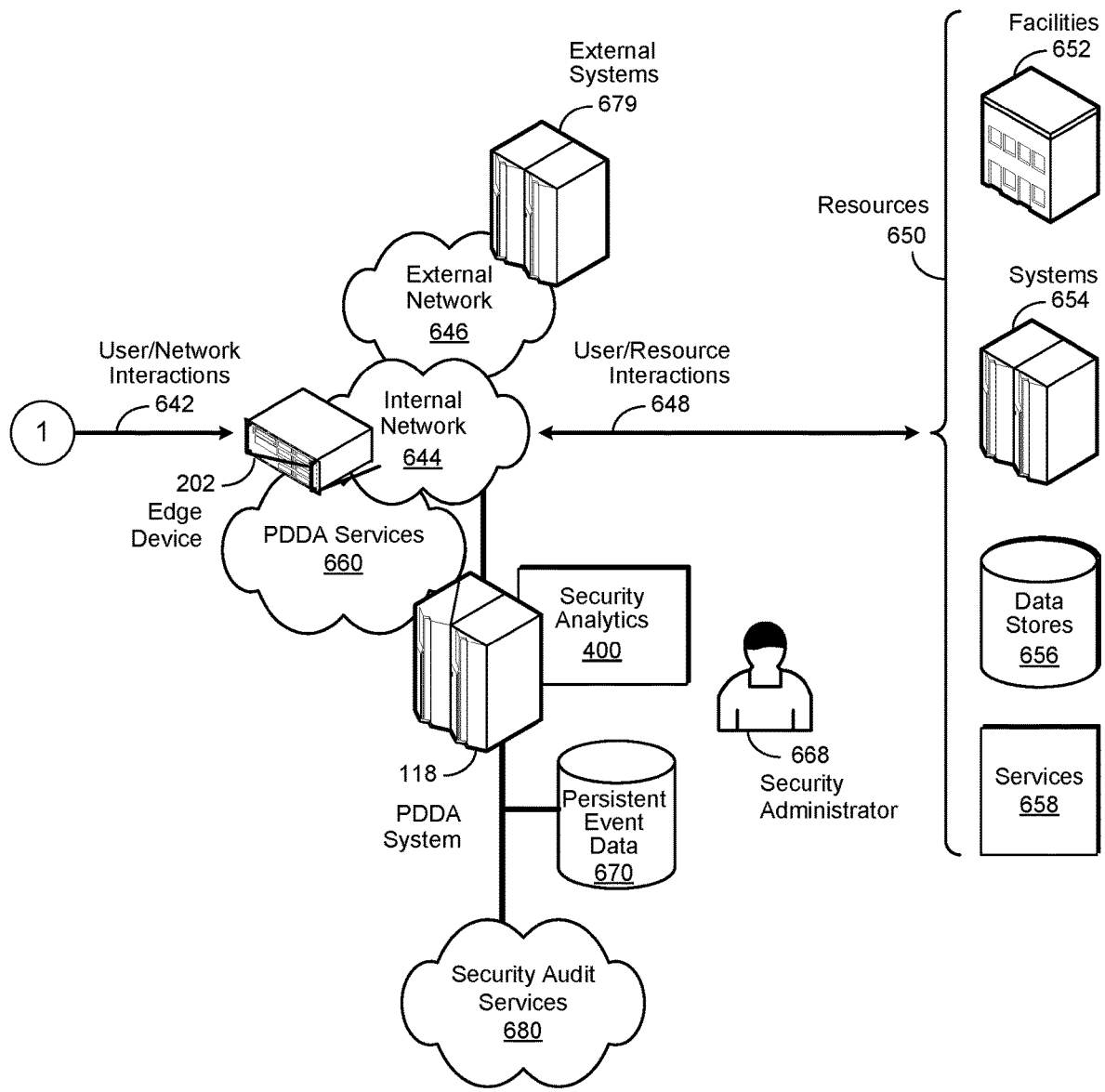

FIGS. 6a and 6b show a simplified block diagram of an environment in which the PDDA system 118 may operate. In certain embodiments, the PDDA system 118 may be implemented to analyze information received at one or more edge devices 202 from a source external to the secured network. In certain embodiments, analyses performed by the PDDA system 118 may be used to identify protected data in the information received at the one or more edge devices 202. In certain embodiments, the PDDA system 118 may be used to identify whether protected data received at the one or more edge devices is anomalous. In certain embodiments, the receipt of protected data is determined to be anomalous if the receipt meets one or more of the following conditions: 1) the protected data is received from an unidentified entity; 2) the protected data is received from a user not authorized to access the protected data; 3) the protected data is received from a device not authorized to communicate protected data; 4) the protected data is received from a third party not authorized to access the protected data; 5) the protected data is downloaded from an unauthorized external source by a user within the secured system; and/or 6) the PDDA system is unable to identify any egress channels for the identified protected data. It will be recognized by those skilled in the art that, based on the teachings of this disclosure, additional criteria for determining receipt of protected data is anomalous may also be used.

In certain embodiments, the PDDA system 118 may use information associated with a user identity that is stored in a user profile to determine whether receipt of protected data is anomalous. In certain embodiments, the PDDA system 118 may use information associated with a user profile to assist in identification of individuals for investigation of security breaches associated with the protected data. As used herein, a user profile broadly refers to a collection of information that uniquely describes a user's identity and their associated behavior, whether the behavior occurs within a physical realm or cyberspace. In certain embodiments, as described in greater detail herein, the user profile may include user profile attributes 612, user behavior factors 614, user mindset factors 628, or a combination thereof.

As used herein, a user profile attribute 612 broadly refers to data or metadata that can be used, individually or in combination with other user profile attributes 612, to uniquely ascertain the identity of a user. In certain embodiments, the user profile attributes 612 may include certain personal information. In certain embodiments, the personal information may include non-sensitive personal information associated with a user, such as their name, title, position, role, and responsibilities. In certain embodiments, the personal information may likewise include technical skill level information, peer information, expense account information, paid time off (PTO) information, data analysis information, insider information, misconfiguration information, third party information, or a combination thereof.

In certain embodiments, the personal information may contain sensitive personal information associated with a user. As used herein, sensitive personal information (SPI), also commonly referred to as personally identifiable information (PII), broadly refers to any information usable to ascertain the identity of a user, either by itself, or in combination with other information, such as contextual information described in greater detail herein. Examples of SPI may include the full or legal name of a user, initials or nicknames, place and date of birth, home and business addresses, personal and business telephone numbers, their gender, and other genetic information.

Additional examples of SPI may include government-issued identifiers, such as a Social Security Number (SSN) or a passport number, vehicle registration plate and serial numbers, and driver's license numbers. Other examples of SPI may include certain email addresses and social media identifiers, credit and debit card numbers, and other digital identity information. Yet other examples of SPI may include employer-issued identifiers, financial transaction information, credit scores, electronic medical records (EMRs), insurance claim information, personal correspondence, and so forth.

In certain embodiments, one or more access control methods 604 are used to control access to the secured network including network resources. In certain embodiments, the access control methods 604 are specific to a given user and may include a user's biometrics 606, a security token 608, (e.g., a dongle containing cryptographic keys), a user identifier/password (ID/PW) 610, or security questions 609 unique to the user, such as those that may require the user to enter SPI. In certain embodiments, the access control methods 604 include prompting for reasons that a user is requesting access to a resource 611. Still further access control methods may include control methods that distinguish between human and machine entry of information, such as Captcha 615.

In certain embodiments, the access control methods 604 may be used in combination to perform multi-factor access control. As used herein, multi-factor access control broadly refers to approaches requiring correct responses to two or more access control methods before access to the resource can be granted.

As used herein, a user behavior factor 614 broadly refers to information associated with a user's behavior, whether the behavior occurs within a physical realm or cyberspace. In certain embodiments, user behavior factors 614 may include the user's access rights 616, the user's interactions 618, and the date/time/frequency 620 of when the interactions 618 are enacted. In certain embodiments, the user behavior factors 614 may likewise include the user's location 624, and the gestures 626 used to enact the interactions 618.

In certain embodiments, the user gestures 626 may include key strokes on a keypad, a cursor movement, a mouse movement or click, a finger swipe, tap, or other hand gesture, an eye movement, or some combination thereof. In certain embodiments, the user gestures 626 may likewise include the cadence of the user's keystrokes, the motion, force and duration of a hand or finger gesture, the rapidity and direction of various eye movements, or some combination thereof. In certain embodiments, the user gestures 626 may include various audio or verbal commands performed by the user.

In various embodiments, certain date/time/frequency 620 behavior factors 614 may be implemented as ontological or societal time, or a combination thereof. As used herein, ontological time broadly refers to how one instant in time relates to another in a chronological sense. As an example, a first user behavior enacted at 12:00 noon on May 17, 2017 has occurred prior to a second user behavior enacted at 6:39 PM on May 18, 2018. Skilled practitioners of the art will recognize one value of ontological time is to determine the order in which various user behaviors have been enacted.

As likewise used herein, societal time broadly refers to the correlation of certain user profile attributes 612, user behavior factors 614, user mindset factors 628, or a combination thereof, to one or more instants in time. As an example, user 'A' 602 may access a system 854 to download a customer list at 3:47 PM on Nov. 3, 2017. Analysis of their user behavior profile indicates that it is not unusual for user 'A' 602 to download the customer list on a weekly basis. However, examination of their user behavior profile also indicates that user 'A' 602 forwarded the downloaded customer list in an email message to user 'B' 662 at 3:49 PM that same day. Furthermore, there is no record in their user behavior profile that user 'A' 602 has ever communicated with user 'B' 662 in the past. Moreover, it may be determined that user 'B' 662 is employed by a competitor. Accordingly, the correlation of user 'A' 602 downloading the customer list at one point in time, and then forwarding the customer list to user 'B' 662 at a second point in time shortly thereafter, is an example of societal time.

In a variation of the prior example, user 'A' 602 may download the customer list at 3:47 PM on Nov. 3, 2017. However, instead of immediately forwarding the customer list to user 'B' 662, user 'A' 602 leaves for a two week vacation. Upon their return, they forward the previously-downloaded customer list to user 'B' 662 at 9:14 AM on Nov. 20, 2017. From an ontological time perspective, it has been two weeks since user 'A' 602 accessed an internal system 654 to download the customer list. However, from a societal time perspective, they have still forwarded the customer list to user 'B' 662, despite two weeks having elapsed since the customer list was originally downloaded.

Accordingly, the correlation of user 'A' 602 downloading the customer list at one point in time, and then forwarding the customer list to user 'B' 662 at a much later point in time, is another example of societal time. More particularly, it may be inferred that the intent of user 'A' 602 did not changed during the two weeks they were on vacation. Furthermore, user 'A' 602 may have attempted to mask an intended malicious act by letting some period of time elapse between the time they originally downloaded the customer list and when they eventually forwarded it to user 'B' 662. From the foregoing, those of skill in the art will recognize that the use of societal time may be advantageous in determining whether a particular user behavior is acceptable, anomalous, abnormal, unexpected or malicious.

As used herein, mindset factors 628 broadly refer to information used to determine the mental state of a user at a particular point in time, during the occurrence of an event or an enactment of a user behavior, or combination thereof. As used herein, mental state broadly refers to a hypothetical state corresponding to the way a user may be thinking or feeling. In certain embodiments, the user mindset factors 628 may include a personality type. Examples of known approaches for determining a personality type 624 include Jungian types, Myers-Briggs type indicators, Keirsy Temperament Sorter, Socionics, Enneagram of Personality, and Eyseneck's three-factor model.

In certain embodiments, the mindset factors 628 may include various behavioral biometrics. As likewise used herein, a behavioral biometric broadly refers to a physiological indication of a user's mental state. Examples of behavioral biometrics may include a user's blood pressure, heartrate, respiratory rate, eye movements and iris dilation, facial expressions, body language, tone and pitch of voice, speech patterns, and so forth.

In certain instances, various user behavior factors 614, such as user gestures 626, may provide additional information related to determining a user's mental state. As an example, a user entering text at a quick pace with a rhythmic cadence may indicate intense focus. Likewise a user intermittently entering text with forceful keystrokes may indicate the user is in an agitated state. As another example, the user may intermittently enter text somewhat languorously, which may indicate being in a thoughtful or reflective state of mind. As yet another example, the user may enter text with a light touch with an uneven cadence, which may indicate the user is hesitant or unsure of what is being entered.

As used herein, contextual information broadly refers to any information, directly or indirectly, individually or in combination, related to a particular user behavior. In certain embodiments, user behavior may include a user's physical behavior, cyber behavior, or a combination thereof. As likewise used herein, a user's physical behavior broadly refers to any user behavior occurring within a physical realm, such as speaking, gesturing, facial patterns or expressions, walking, and so forth. More particularly, such physical behavior may include any action enacted by a user that can be objectively observed, or indirectly inferred, within a physical realm. In certain embodiments, the objective observation, or indirect inference, of the physical behavior may be performed electronically.

As an example, a user may attempt to use an electronic access card to enter a secured building at a certain time. In this example, the use of the access card to enter the building is the action and the reading of the access card makes the user's physical behavior electronically-observable. As another example, a first user may physically transfer a document to a second user, which is captured by a video surveillance system. In this example, the physical transferal of the document from the first user to the second user is the action. Likewise, the video record of the transferal makes the first and second user's physical behavior electronically-observable. As used herein, electronically-observable user behavior broadly refers to any behavior exhibited or enacted by a user that can be observed through the use of an electronic device (e.g., an electronic sensor), a computing device or system (e.g., an endpoint device 304), computer instructions (e.g., a software application), or a combination thereof.

Cyber behavior, as used herein, broadly refers to any behavior occurring in cyberspace, whether enacted by an individual user, a group of users, or a system acting at the behest of an individual user, a group of users, or an entity. More particularly, cyber behavior may include physical, social, or mental actions that can be objectively observed, or indirectly inferred, within cyberspace. As an example, a user may use an endpoint device 304 to access and browse a particular website on the Internet. In this example, the individual actions performed by the user to access and browse the website constitute a cyber behavior. As another example, a user may use an endpoint device 304 to download a data file from a particular system at a particular point in time. In this example, the individual actions performed by the user to download the data file, and associated temporal information, such as a time-stamp associated with the download, constitute a cyber behavior. In these examples, the actions are enacted within cyberspace, in combination with associated temporal information, which makes them electronically-observable.

As likewise used herein, cyberspace broadly refers to a network environment, such as an internal network 644 or external network 646, capable of supporting communication between two or more entities. In certain embodiments, the external network 646 may be used to access external systems 679. In certain embodiments, the entity may be a user, an endpoint device 304, or various resources, described in greater detail herein. In certain embodiments, the entities may include various endpoint devices 304 or resources 650 operating at the behest of an entity, such as a user. In certain embodiments, the communication between the entities may include audio, image, video, text, or binary data.

In certain embodiments, the contextual information may include a user's authentication factors associated with access control methods 604. In certain embodiments, contextual information may likewise include various user identity resolution factors, such as personal information associated with the user, the date/time/frequency 620 of various user behavior, the user's location 624, the user's role or position in an organization, their associated access rights 616, and certain user gestures 626 employed by the user in the enactment of a user behavior. Other contextual information may likewise include various user interactions, whether the interactions are with an endpoint device 304, a network 140, a resource 650, or another user. In certain embodiments, user behaviors, and their related contextual information, may be collected at particular points of observation, and at particular points in time, described in greater detail herein.

In certain embodiments, a user profile may be processed with associated contextual information to generate correlated contextual information. In certain embodiments, the correlated contextual information, along with a user's user profile, may be used to perform certain user behavior analysis. In certain embodiments, the user behavior analysis may be performed by the security analytics system 512. In certain embodiments, the security analytics system 512 may be implemented to process a user profile and certain correlated contextual information associated with a user to determine their mental state at a particular point in time. In certain embodiments, the mental state of a user at a particular point in time may be used in combination with various user profile attributes 612 and user behavior factors 614, in the context of an associated user state, to infer a user's intent.

In certain embodiments, a user profile may be used with a first set of contextual information to determine the user's mental state at a first point in time and a second set of contextual information to determine their mental state at a second point in time. In certain embodiments, the user's mental state at a first point in time may correspond to the occurrence of a first user event and the user's mental state at a second point in time may correspond to the occurrence of a second user event. Certain embodiments of the invention reflect an appreciation that such a first and second set of contextual information may be decidedly different, which may provide context for the user's mental state at different times and during the occurrence of different user events. Likewise, the first and second set of contextual information may be substantively the same, which may provide an indication that while the user's mental state may be different at two points in time, or during the occurrence of two different user events, the cause of their mental state may not be related to the contextual information that was collected at the two points in time.

It will be appreciated that over time, the user behavior of a particular user, such as user 'A' 602, will be uniquely different and distinct from another user, such as user 'B' 662. Accordingly, user profile '1' will uniquely reflect the user behavior of user '1', just as user profile 'n' will uniquely reflect the user behavior of user 'n'. As an example, user 'A' 602 may have a user profile attribute 612 of sales administrator. Upon arriving at their office in the morning, the user consistently checks their email, item by item, responding to each in turn, followed by processing expense reports for field sales personnel. Then, after lunch, the user may access and review sales forecasts on an internal system 654. Furthermore, the user may exhibit sporadic keyboard entry interspersed with extensive mouse activity, or user gestures 626, when perusing the sales forecasts.

Moreover, personality type information associated with user 'A' 602 may indicate the user consistently exhibits a positive, outgoing attitude. In this example, the sequence of the activities enacted by user 'A' 602 throughout the day, and their frequency, correspond to their expected date/time/frequency 620 user behavior factors 614. Likewise, the keyboard cadence and other user gestures 626 are examples of granular user behavior factors 614, while the personality type information is an example of an abstract user behavior factor 614.

As another example, user 'B' 662 may have a user profile attribute 612 of financial controller. Upon arriving at their office in the morning, the user usually scans their email messages, responding only to those that are urgent. Then they check the daily budget status of each department to see whether they are conforming to their respective guidelines. After lunch, the user may follow up on emails that are less urgent, followed by updating the organization's financials, likewise on an internal system 654. Additionally, user 'B' 662 may exhibit deliberate keyboard entry interspersed with iterative mouse activity, or user gestures 626, when updating financial information. Moreover, personality type information associated with user 'B' 662 may indicate they consistently exhibit a reserved, introspective and contemplative attitude. As in the prior example, the sequence of the activities enacted by user 'B' 662 throughout the day, and their frequency, correspond to their expected date/time/frequency 620 user behavior factors 614. Likewise, as before, the keyboard cadence and other user gestures 626 are examples of granular user behavior factors 614, while the personality type information is an example of an abstract user behavior factor 614.

It will likewise be appreciated that the user behavior of a particular user may evolve over time. As an example, certain user behavior exhibited by a user during the first month of assuming a new position within an organization may be quite different than the user behavior exhibited after being in the position for six months. To continue the example, the user may be somewhat tentative when learning to access and interact with unfamiliar resources 650 in the first month in the position, but by the sixth month, such access and interaction is commonplace and routine.

In certain examples, a user behavior factor 614 associated with a particular user, such as user 'A' 602 or 'B' 662, may be used to compare the user's current user behavior to past user behavior. If the user's current user behavior matches their past user behavior, then the PDDA 118 may assign a lower priority to the user for investigative purposes than a user whose user behavior has significantly changed over time. However, a change in a particular user's user behavior over time may not be anomalous, abnormal, unexpected, or malicious. Instead, it may be acceptable behavior that simply evolves over time as a natural result of day-to-day user/device 630, user/network 642, user/resource 648, or user/user 660 interactions. In certain embodiments, the PDDA system 118 may be implemented to determine whether such changes in a user's user behavior over time are acceptable, anomalous, abnormal, unexpected or malicious. In certain embodiments, the PDDA system 118 to make this temporal determination.

It will be appreciated that anomalous, abnormal, unexpected or malicious user behavior may include inadvertent or compromised user behavior. For example, the user may have innocently miss-entered a request for data that is protected data of an organization. As another example, the user may be attempting to access confidential information as a result of being compromised. As yet another example, a user may attempt to access certain protected data from their home, over a weekend, and late at night. In this example, the user may be working from home on a project with an impending deadline. Accordingly, the attempt to access the protected data is legitimate, yet still anomalous, abnormal or unexpected as the attempt did not occur during the week, from the user's place of employment, during normal work hours. However, the user behavior may manifest in context with consistent remote access patterns and provide sufficient evidence to determine the nature of the activity.

In certain embodiments, the endpoint device 304 may be used to communicate data through the use of an internal network 644, an external network 646, or a combination thereof. In certain embodiments, the internal network 644 and the external network 646 may include a public network, such as the Internet, a physical private network, a virtual private network (VPN), or any combination thereof. In certain embodiments, the internal network 644 and external network 646 may likewise include a wireless network, including a personal area network (PAN), based on technologies such as Bluetooth. In various embodiments, the wireless network may include a wireless local area network (WLAN), based on variations of the IEEE 802.11 specification, commonly referred to as WiFi. In certain embodiments, the wireless network may include a wireless wide area network (WWAN) based on an industry standard including various 3G, 4G and 5G technologies.

In certain embodiments, the user/resource 648 interactions may include interactions with various resources 650. In certain embodiments, the resources 650 may include various facilities 652 and internal systems 654, either of which may be physical or virtual, as well as data stores 656 and services 658. In certain embodiments, the user/user 660 interactions may include interactions between two or more users, such as user 'A' 602 and 'B' 662. In certain embodiments, the user/user interactions 660 may be physical, such as face-to-face meetings, via a user/device 630 interaction, a user/network 642 interaction, a user/resource 648 interaction, or some combination thereof.

In certain embodiments, User 'B' 662 may be a third-party, such as a customer or business partner, and the user/user 660 interactions may include face-to-face business meetings in which copies of physical documents containing protected data are transferred from User 'A' 602 to User B'. In other examples, physical documents containing protected data may be transferred from User 'A' 602 to User 'B' using, for example, a courier (e.g., mail, commercial courier, private courier, etc.). In certain embodiments in which the User 'B' 662 is a third-party, notes are taken during meetings and/or telephone calls that include protected data. In other examples, protected data, such as protected files, may be transferred from User 'A' 602 to User 'B' on a portable electronic storage device, such as a USB drive, data disc, or portable disk drive. It may be beneficial to identify and log such user/user 660 interactions in the security system as sources of egress of the protected data.

In certain embodiments, the user/user 660 interaction may include a face-to-face verbal exchange between two users, which may be useful in monitoring user behavior. In certain embodiments, the user/user 660 interaction may include a written exchange, such as text written on a sheet of paper, between two users. In certain embodiments, the user/user 660 interaction may include a face-to-face exchange of gestures, such as a sign language exchange, between two users. In certain embodiments, temporal event information associated with various interactions 630, 642, 648, 660 may be collected and used to define and manage a user profile.

In certain embodiments, cyber behavior of various kinds may be monitored to within an internal network 644. As an example, the cyber behavior within an internal network 644 network may include a user accessing a particular internal system 654 or data store 656. In certain embodiments, the point of observation may include cyber behavior of various kinds within an external network 646. As an example, the cyber behavior within an external network 646 may include a user's social media activities or participation in certain user forums. Those of skill in the art will recognize that many such examples of user/device 630, user/network 642, and user/resource 648 are possible. Accordingly, the foregoing is not intended to limit the spirit, scope or intent of the invention.

In certain embodiments, the location data 636 may include Global Positioning System (GPS) data provided by a GPS satellite 638. In certain embodiments, the location data 636 may include location data provided by a wireless network, such as from a cellular network tower 640. In certain embodiments (not shown), the location data 636 may include various Internet Protocol (IP) or other network address information assigned to the endpoint 304 or edge device 202. In certain embodiments (also not shown), the location data 636 may include recognizable structures or physical addresses within a digital image or video recording.

In certain embodiments, the endpoint devices 304 may include an input device (not shown), such as a keypad, magnetic card reader, token interface, biometric sensor, digital camera, video surveillance camera, and so forth. In certain embodiments, such endpoint devices 304 may be directly, or indirectly, connected to a particular facility 652 or system 854. As an example, the endpoint device 304 may be directly connected to an ingress/egress system, such as an electronic lock on a door or an access gate of a parking garage. As another example, the endpoint device 304 may be indirectly connected to a physical security mechanism through a dedicated security network.

In certain embodiments, the PDDA system 118 may be implemented as a stand-alone system. In certain embodiments, the PDDA system 118 may be implemented as a distributed system. In certain embodiments, the PDDA system 118 may be implemented as a virtual system, such as an instantiation of one or more virtual machines (VMs). In certain embodiments, the PDDA system 118 may be implemented to use various event data stored in a repository of persistent event data 670 to detect events in which protected data was received from an external source.

In certain embodiments, the PDDA system 118 may be implemented as a PDDA service 660. In certain embodiments, the PDDA service 660 may be implemented in a cloud environment familiar to those of skill in the art. Those of skill in the art will recognize that many such embodiments are possible. Accordingly, the foregoing is not intended to limit the spirit, scope or intent of the invention.

In certain embodiments, users, such as User 'A' 602 through User 'n' 606, interact with endpoint devices 304 to communicate with one or more edge devices 202. In certain embodiments, the edge device 202 is configured to control access to one or more resources 210. Exemplary resources may include electronic interfaces used to access physical facilities 652, computer systems 654, data stores 656, and application services 658.

Figure 7:
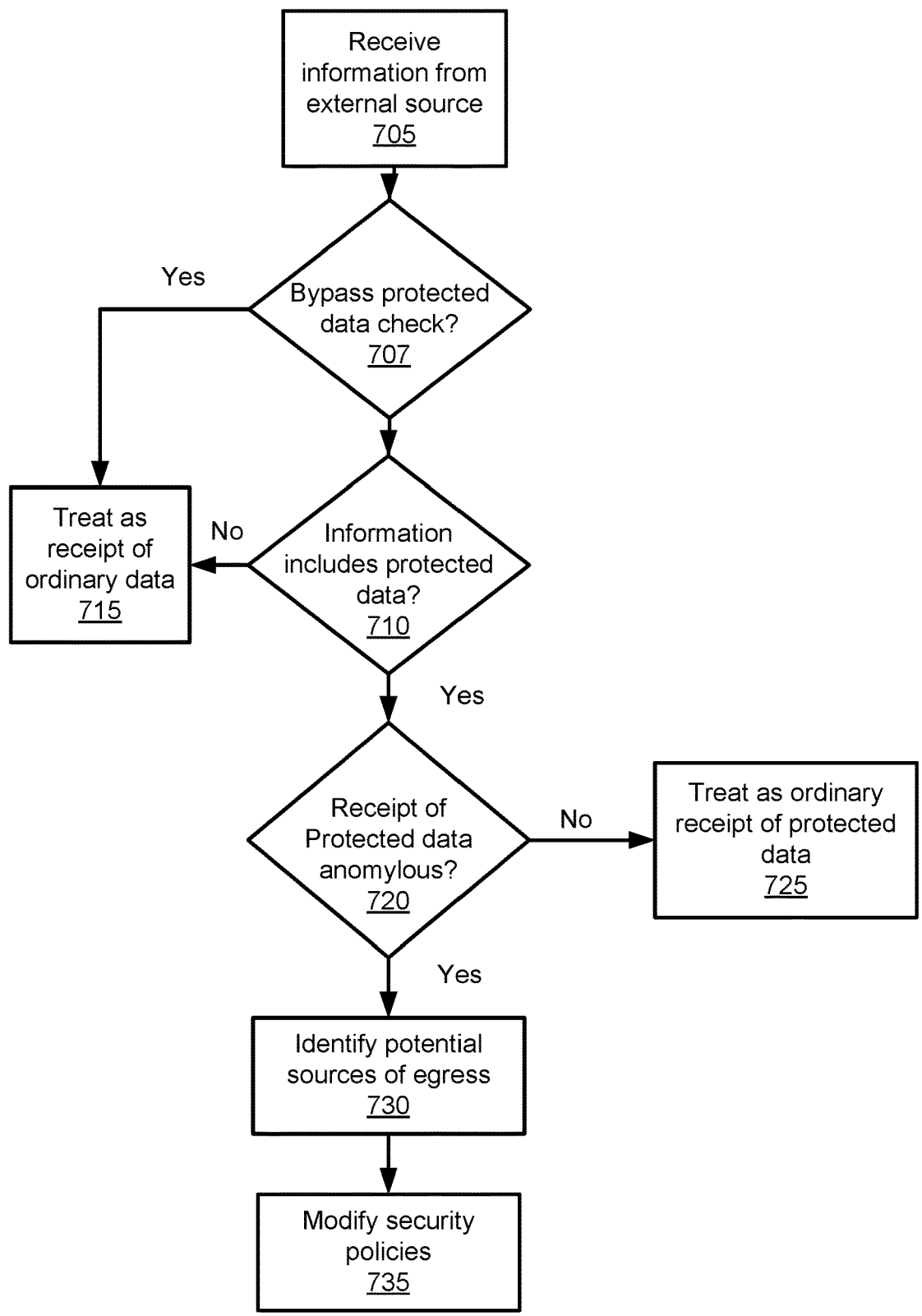
FIG. 7 is a flowchart depicting exemplary operations that may be executed in certain embodiments of the protected data detection and analysis system.

FIG. 7 is a flowchart depicting exemplary operations that may be executed to implement certain embodiments of the PDDA system. In this example, information is received from a source external to the secured network at operation 705 and, for example, edge device 202. In certain embodiments, the PDDA system may implement one or more ingress rules at operation 707 to determine whether a subsequent analysis of the information for protected data is to be conducted. In some instances, the data may be received from an external source who normally transmits protected data to the secured network. In such instances, the received data may be ignored since it is coming from a trusted third-party or user. In other instances, the PDDA system may be implemented to ignore certain types of communications while analyzing other types. In certain embodiments, the PDDA system may be implemented to analyze files attached to an email while ignoring the email text. In certain embodiments, the PDDA system a may be implemented to analyze files downloaded from our website while ignoring other data on the website. Various other ingress rules may be made at operation 707 to determine whether the received data is to be analyzed for protected data.

If the protected data analysis operations are to be bypassed, the received information may be treated as ordinary data at operation 715. In such instances, the secured system may handle the receipt of the information as it would any other transmission from an external source. This may include, for example, subsequent analysis of the received information for malicious content, malware, spyware, viruses, and/or other typical security scans. In certain embodiments, such security scans are conducted contemporaneously with the analysis of the received information by the PDDA system. In certain embodiments, such scans are conducted prior to the time at which the PDDA system 118 receives the information at operation 705.

If the received information is not bypassed at operation 707, the received information is analyzed at operation 710 to determine whether the information includes protected data, as will be further described below. If the received information does not include protected data, the transmission from the external source may be treated as ordinary information at operation 715. However, if the received information includes protected data, a check is made at operation 720 to determine whether receipt of the protected data from the external source is anomalous, examples of which are described in further detail below. If the receipt of the protected data is not anomalous, the received information may be treated as an ordinary transmission of protected data from the external source at operation 725 subject to, for example, security scans, if any.

However, if the receipt is anomalous, the PDDA system may identify potential sources of egress of the protected data at operation 730. In certain embodiments, security system records may be retrieved by the security administrator 668 from security analytics 400 and/or security audit services 680 to identify instances in which the protected data was accessed, printed, physically conveyed, and/or electronically communicated to an entity external to the secured network. In certain embodiments, the PDDA system may automatically search the security system records to identify such instances. Once identified, the corresponding channels of egress can be checked to determine which, if any, users may have violated existing security policies, put the protected data at risk, or disseminated the protected data to a third-party who failed to adequately secure the protected data. At operation 735, security policies associated with the identified sources of egress and/or corresponding egress channels may be modified or updated based on the information obtained at operation 730.

Figure 8A:
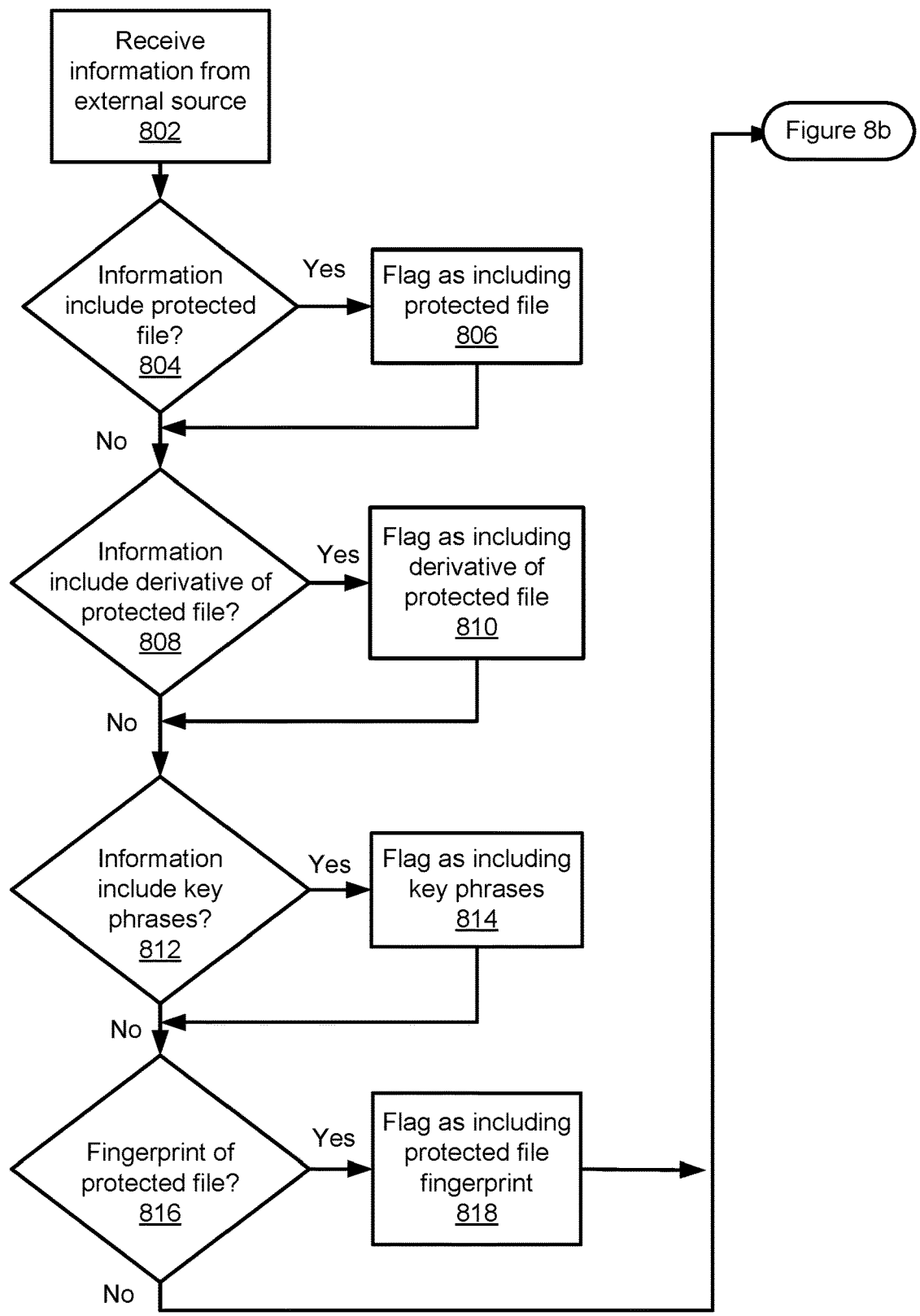
FIGS. 8a-8c is a flowchart depicting exemplary operations that may be executed in certain embodiments of the protected data detection and analysis system.
Figure 8B:
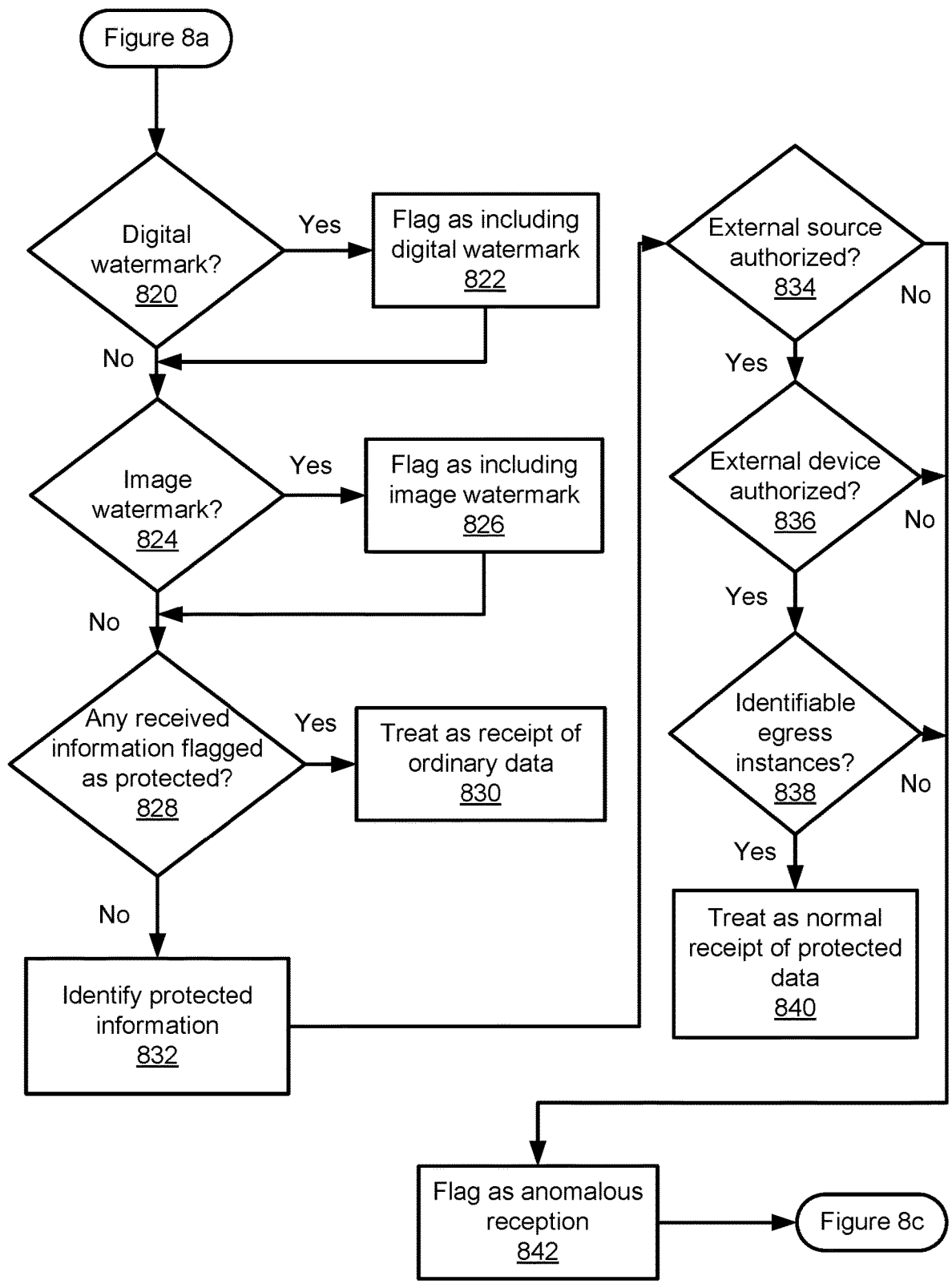
Figure 8C:
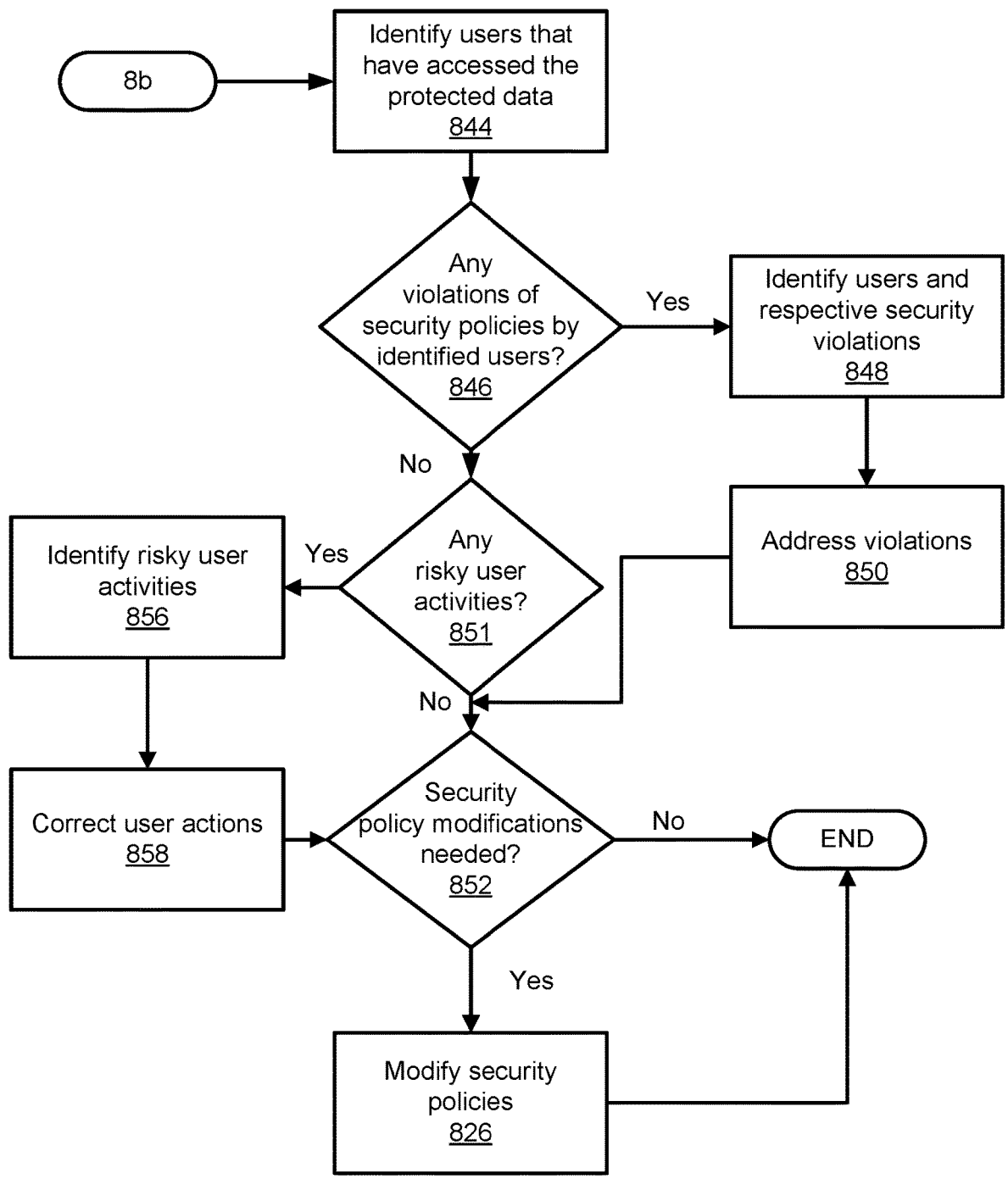

FIG. 8 (divided into FIGS. 8a through 8c) is a flowchart showing various operations that may be executed by certain embodiments of the PDDA system. In this example, information is received by the secured system from an external source at operation 802.

Unless the ingress rules, if any, directs the received information so as to bypass the PDDA system, the received information is checked to determine whether the received information includes protected data in one or more subsequent operations. Although FIG. 8 shows a number of different operations that may be executed to determine whether the received information includes protected data, it will be recognized that the PDDA system need not execute all such protected data detection operations. Nor does the PDDA system need to execute the protected data detection operations in the sequence shown in FIG. 8. Still further, it will be recognized that other protected data detection operations may be executed instead of, or in addition to, those shown in FIG. 8. Once the teachings of the present disclosure are understood, it will be recognized by those skilled in the art that selection of specific protected data detection operations are a matter of design choices.

Whether the received information includes protected data may be determined in one or more operations shown in FIG. 8. In certain embodiments, a check is made at operation 804 to determine whether the information includes a protected file known to exist within the secured network. If the information includes a protected file, the information may be flagged as including the protected file at operation 806, after which the PDDA system may continue to execute further protected file analyses.

In certain embodiments, if the received information does not include a protected file, the PDDA system may proceed to operation 808 to determine whether the received information includes a derivative of a protected file. If the information includes a derivative of a protected file, the information may be flagged as including the derivative of the protected file at operation 810, after which the PDDA system may continue to execute further protected file analyses.

In certain embodiments, if the received information does not include a protected file, the PDDA system may proceed to operation 808 to determine whether the received information includes a derivative of a protected file. If the information includes a derivative of a protected file, the information may be flagged as including the derivative of the protected file at operation 810, after which the PDDA system may continue to execute further protected file analyses.

In certain embodiments, if the received information does not include a derivative of a protected file at operation 808, the PDDA system may proceed to operation 812 to determine whether the received information includes any key phrases relating to protected data. In certain embodiments, key phrases may be those that are specifically known to relate to protected data. In certain embodiments, the key phrases may include project names associated with protected data, names of potential clients, and/or text specifically identifying the information as protected data. In certain embodiments, the text of document headers, footers, titles, and/or subsections may be scanned for the key phrases. Text specifically identifying the information as protected data may include text such as "confidential," "proprietary," "need to know," and/or "secret." Those skilled in the art will recognize that other key phrases may be used in the detection of protected data in light of the present disclosure. If the information includes such key phrases, the information may be flagged as including such key phrases at operation 814, after which the PDDA system may continue to execute further protected file analyses.

In certain embodiments, if the received information does not include key phrases associated with protected data at operation 812, the PDDA system may proceed to operation 818 to determine whether the received information includes a fingerprint corresponding to protected data, such as a fingerprint of a protected file. As used herein, a fingerprint refers to data resulting from application of a fingerprinting algorithm to a data item that maps an arbitrarily larger data item to a shorter bit string. The resulting fingerprint data uniquely identifies the original data and may be compared against fingerprint data of known protected files. If the information includes a fingerprint of a protected file, the information may be flagged as including the fingerprint of the protected file at operation 818, after which the PDDA system may continue to execute further protected file analyses.

In certain embodiments, if the received information does not include the fingerprint of a protected file at operation 816, the PDDA system may proceed to operation 820 to determine whether the received information includes a digital watermark corresponding to a protected data file. As used herein, a digital watermark is a kind of marker covertly embedded in a noise-tolerant signal such as audio, video or image data. In certain embodiments, the digital watermark may be a piece of code embedded in a digital image, video, or audio file that is typically undetectable during normal use of the file. In certain embodiments, digital watermarks may be included in protected data to identify that the protected data is owned by the company. Those skilled in the art will recognize that digital watermarks may be employed in various manners to identify protected data. If the information includes a digital watermark corresponding to a protected file, the received information may be flagged as including the digital watermark at operation 822, after which the PDDA system may continue to execute further protected file analyses.

In certain embodiments, if the received information does not include the digital watermark of a protected file at operation 820, the PDDA system may proceed to operation 824 to determine whether the received information includes an image watermark corresponding to a protected document. As used herein, an image watermark is an identifying image or pattern on a physical medium, such as paper, that appears as various shades of lightness/darkness when viewed by transmitted or reflected light. An image watermark differs from a digital watermark in that it is not specifically encoded in the data but, rather, is derived from an analysis of the image. In certain embodiments, the received data may include a scanned image of a protected document having an image watermark. In certain embodiments, the PDDA system may analyze the received image to determine whether it includes a watermark found in the company's protected documents. If the image includes such an image watermark corresponding to a protected document, the received information may be flagged as including the image watermark at operation 822.

At operation 828, the PDDA system may check to determine whether any of the received information has been flagged as including protected data. If not, the received information may be treated as ordinary data at operation 830 and subject to further security analysis or data processing, if any.

If any of the received information has been flagged as including protected data, the PDDA system may attempt to specifically identify the protected information and/or the type of protected information at operation 832. In certain embodiments, operation 832 is independent of operations 804-828. In certain embodiments, operation 832 is integrated with one or more of operations 804-828. To this end, the operations that detect the presence of protected data may be integrated with operations that identify the corresponding protected data on the secured network. In certain embodiments, the analysis at operation 804 used to determine that the received information includes a protected file may also include an identification of the corresponding file on the secured network. In certain embodiments, the analysis at operation 808 used to determine that the received information includes a derivative of a protected file may also include an identification of the corresponding protected file on the secured network. In certain embodiments, the analysis at operation 812 used to determine that the received information includes key phrases associated with protected data may also include identification of one or more protected files including the key phrases on the secured network. In certain embodiments, the analysis at operation 816 used to determine that the received information includes a fingerprint of a protected file may include identification of the protected file having the same fingerprint on the secured network. In certain embodiments, the analysis at operation 820 used to determine that the received information includes a digital watermark of a protected file may also include identification of protected files having the same digital watermark in the secured network. In certain embodiments, the analysis at operation 824 used to determine that the received information includes an image watermark of a protected document may also include identification of the protected documents having the same image watermark in the secured network.

Once the protected information has been identified (if identification is possible), one or more operations may be executed to determine whether the receipt of the protected data is anomalous. In certain embodiments, a check may be made at operation 834 to determine whether the external source has authorization to access the protected information. If the external source does not have authorized access to the protected information at operation 834, the receipt of the protected information may be flagged as anomalous at operation 842. Otherwise, at operation 836, a check may be made to determine whether the external device from which the protected information was received is authorized to access the protected data. If the external device does not have authorization to access the protected information at operation 836, the receipt of the protected information may be flagged as anomalous at operation 842. Otherwise, at operation 838, a check may be made to determine whether there have been any records showing that the protected data was communicated from a source within the secured network to an entity outside the secured network. A lack of any such identifiable communications of the protected data indicates that the communication of the protected data was made without detection by the secured network. For example, the protected data may have been obtained by a malicious hacker, such as User 'X' in which case the channel through which the malicious hacker obtained the protected data may not be adequately protected by the security system. In another example, the protected data may have left the company through an authorized user with malicious intent. In another example, an authorized user may have provided the protected data to a third-party through a broken business process or a channel that is not adequately secured by the security system under existing security policies. Additionally, or in the alternative, if the security system does not have a record showing that the protected data was conveyed outside of the secured network, the receipt of the protected data may be flagged as anomalous at operation 842.

In certain embodiments, subsequent operations executed by the PDDA system may be dependent on whether the receipt of the protected data is anomalous. In this regard, if the receipt of the protected data is not anomalous, the secured network may treat the received information as it would normally treat reception of protected data at operation 840. Otherwise, an investigation may be instituted to identify egress channels through which the protected data identified by the PDAA system may have been communicated outside the secured network. In certain embodiments, the PDDA system merely identifies anonymously received protected data that has been so that IT personnel, such as security administrator 668, may use security system tools to search records relating to the protected data and identify potential sources of egress of the protected data. In certain embodiments, the system tools may be tools already existing on the secured network. In certain embodiments, the PDDA system may implement its own search tools that may be utilized by IT personnel to identify potential sources of egress. In certain embodiments, the PDDA system may automatically execute a search of security system records and, in certain embodiments, provide a report identifying potential sources of egress of the protected data.

Regardless of the tools used to search the records of the security system, one or more operations may be executed as part of an investigation into any egress of the protected data. In certain embodiments, users that have access rights to the protected data may be identified. However, in certain embodiments, it may be preferable to execute an operation, such as operation 844, to identify users that have actually accessed the protected information. In certain embodiments, security system records may be searched to identify users that have accessed protected facilities in which protected data, such as protected documents, are stored. Identification of users that have accessed such protected facilities may be particularly useful in situations in which an image watermark relating to a protected document has been detected. At operation 846, the investigation may turn to whether any of the identified users violated security policies. If security policies have been violated, the particular users and corresponding security violations may be identified at operation 848 and addressed with the user at operation 850. To this end, the user may need to be educated about the security policies of the company, warned about the violation, or dismissed from employment. Once the violations have been addressed at operation 850, a check may be made at operation 852 to determine whether there are any security policies that should be updated or modified in view of the security violation. If so, such modifications may be made at operation 826.

If there are no security violations detected at operation 846, the investigation may proceed to analyze user activities at operation 851. In certain embodiments, the user activities may include conditions that the user has created that have placed the protected data at risk. Such user activities may include the user using a personal cloud network account from within the secured network. In certain embodiments, the investigation may be prioritized based on the severity of the risk to the protected data resulting from the user's activities. User activities placing the protected data at greater risks may be prioritized for investigative purposes over user activities that may have placed protected data at lower risks.

In certain embodiments, the user activities may relate to a user's behavior profile. Users having behavior profiles with a higher security risk may be prioritized for investigation over users having behavior profiles with a lower security risk. The prioritization may be based on the user's behavior profile existing at the time(s) the user access the protected data. In certain embodiments, the prioritization may be based on the degree to which a user's behavior profile has changed over time. In certain embodiments, the prioritization may be based on the user's behavior existing at the time of the investigation.

If operation 801 determines that one or more of the identified users has engaged in risky user activities at operation 801, the particular user activities may be identified at operation 856 and actions to correct the user's activities may be corrected at operation 858. At operation 852, a check is made to determine whether any of the company's security policies should be modified or updated in view of the risky user activities. Modification and/or updating of the security policies may be undertaken at operation 826.

Figure 9:
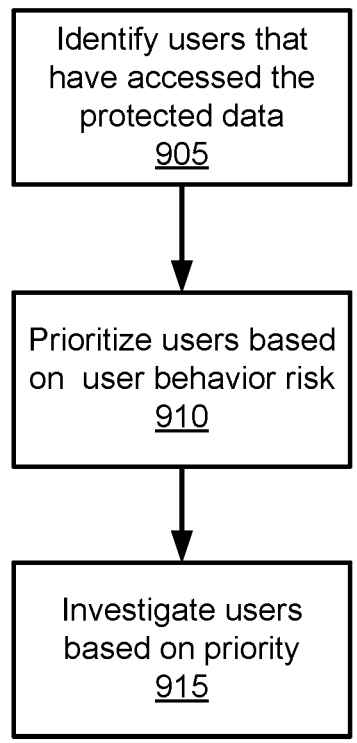
FIG. 9 is a flowchart depicting exemplary operations that may be executed in certain embodiments of the protected data detection and analysis system.

FIG. 9 shows exemplary operations that may be conducted during an investigation of an anomalous reception of protected data. In this example, users that have access the protected data are identified at operation 905. At operation 910, the behavior profiles for each of the identified users may be accessed and used to prioritize the investigation of the identified users. Users having behavior profiles with higher degrees of security risk may have a higher priority for the investigation then users having behavior profiles with lower degrees of security risk. At operation 915, the users identified at operation at 905 are investigated based on the prioritizations made at operation of 910.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer-usable or computer-readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are only examples and are not exhaustive of the scope of the invention. Consequently, the invention is intended to be limited only by the spirit and scope of the appended claims, giving full cognizance to equivalents in all respects.

What is claimed is:

1. A computer-implementable method for mitigating security breaches associated with dissemination of protected data, comprising:
    receiving information communicated to a secured network from a source external to the secured network, the secured network comprising an electronic security system that implements security policies to avoid and track unauthorized access, exploitation, modification or denial of network resources;
    determining whether the received information includes protected data, the protected data comprising data over which the secured network exercises controlled access and does not make available without the controlled access; and
    if the received information includes protected data, determining whether the receipt of the protected data is anomalous, receipt of the protected data being anomalous indicating the protected data was disseminated from the secured network in a broken business process not included in the security policies; and
    if the receipt of the protected data is anomalous, identifying one or more sources of egress of the protected data from the secured network.

2. The method of claim 1, wherein the receipt of the protected data is determined to be anomalous under one or more conditions comprising:
    determining that the external source is not authorized to access the protected data;
    determining that the external source utilizes an unauthorized device to electronically communicate the protected data to the secured network; and/or
    determining that there are no identifiable sources of egress of the protected data from the secured network.

3. The method of claim 1, wherein determining whether the received information includes protected data comprises one or more of:
    determining whether the received protected data includes a duplicate of one or more protected files stored in the secured network; and/or
    determining whether the received protected data includes one or more files derived from one or more protected files stored in the secured network.

4. The method of claim 1, further comprising:
    if the receipt of the protected data is anomalous,
        saving session data for a session in which the protected data was received; and
        tagging the session data as including an anomalous receipt of the protected data to thereby facilitate identification of the external source.

5. The method of claim 4, further comprising:
    if the receipt of the protected data is anomalous,
        searching analytics data to identify entities within the secured network that have transmitted the protected data to the external source based, at least in part, on the tagged session data.

6. The method of claim 1, further comprising:
    if the receipt of the protected data is anomalous,
        searching analytics data to identify entities within the secured network that have transmitted the protected data to one or more entities external to the secured network.

7. The method of claim 6, further comprising:
    searching analytics data to identify entities that have accessed the protected data within the secured network when no occurrences of transmission of the protected data to one or more entities external to the secured network are identifiable.

8. The method of claim 7, further comprising:
    prioritizing a security breach investigation of entities that have accessed protected data within the secured network based on user behaviors of the entities.

9. The method of claim 1, wherein identifying one or more sources of egress of the protected data from within the secured network comprises:
    identifying business processes through which the protected data was manually conveyed to third parties.

10. The method of claim 1, wherein the determination of whether the received information includes protected data comprises one or more of:
- comparing key phrases extracted from the received information with key phrases associated with protected data stored in the secured network;
- comparing a file fingerprint of the received information with one or more file fingerprints of files containing protected data stored in the secured network;
- comparing a digital watermark extracted from the received information with one or more digital watermarks associated with protected data stored in the secured network; and
- comparing an image watermark extracted from the received information with one or more image watermarks associated with protected data stored in the secured network.

11. A system comprising:
- a processor;
- a data bus coupled to the processor; and
- a non-transitory, computer-readable storage medium embodying computer program code, the non-transitory, computer-readable storage medium being coupled to the data bus, the computer program code interacting with a plurality of computer operations and comprising instructions executable by the processor and configured for:
    - receiving information communicated to a secured network from a source external to the secured network, the secured network comprising an electronic security system that implements security policies to avoid and track unauthorized access, exploitation, modification or denial of network resources;
    - determining whether the received information includes protected data, the protected data comprising data over which the secured network exercises controlled access and does not make available without the controlled access; and
    - if the received information includes protected data, determining whether the receipt of the protected data is anomalous, receipt of the protected data being anomalous indicating the protected data was disseminated from the secured network in a broken business process not included in the security policies; and
    - if the receipt of the protected data is anomalous, identifying one or more sources of egress of the protected data from the secured network.

12. The system of claim 11, wherein the instructions are configured for determining that receipt of the protected data is anomalous under one or more conditions comprising:
- determining that the external source is not authorized to access the protected data;
- determining that the external source utilizes an unauthorized device to electronically communicate the protected data to the secured network; and/or
- determining that there are no identifiable sources of egress of the protected data from the secured network.

13. The system of claim 11, wherein determining whether the received information includes protected data comprises one or more of:
- determining whether the received protected data includes a duplicate of one or more protected files in the secured network; and
- determining whether the received protected data includes one or more files derived from one or more protected files in the secured network.

14. The system of claim 11, further comprising:
if the receipt of the protected data is anomalous,
- saving session data for a session in which the protected data was received; and
- tagging the session data as including an anomalous receipt of the protected data to thereby facilitate identification of the external source.

15. The system of claim 14, further comprising:
if the receipt of the protected data is anomalous,
- searching analytics data to identify entities that have transmitted the protected data to the external source based, at least in part, on the tagged session data.

16. The system of claim 11, further comprising:
if the receipt of the protected data is anomalous,
- searching analytics data to identify entities within the secured network that have transmitted the protected data to one or more entities external to the secured network.

17. The system of claim 11, further comprising:
searching analytics data to identify entities within the secured network that have accessed the protected data within the secured network when no occurrences of transmission of the protected data to one or more entities external to the secured network are identifiable.

18. The system of claim 11, wherein identifying one or more sources of egress of the protected data from within the secured network comprises:
- identifying business processes through which the protected data was manually conveyed to third parties.

19. The system of claim 11, further comprising:
- prioritizing a security breach investigation of entities that have accessed protected data within the secured network based on user behaviors of the entities.

20. The system of claim 11, wherein the determination of whether the received information includes protected data comprises one or more of:
- comparing key phrases extracted from the received information with key phrases associated with protected data stored in the secured network;
- comparing a file fingerprint of the received information with one or more file fingerprints of files containing protected data stored in the secured network;
- comparing a digital watermark extracted from the received information with one or more digital watermarks associated with protected data stored in the secured network; and
- comparing an image watermark extracted from the received information with one or more image watermarks associated with protected data stored in the secured network.

* * * * *